(12) United States Patent
Shirasuka

(10) Patent No.: US 9,210,464 B2
(45) Date of Patent: Dec. 8, 2015

(54) DIGITAL BROADCAST RECEIVER DEVICE AND DIGITAL BROADCAST RECEIVING METHOD

(71) Applicant: MITSUBISHI ELECTRIC CORPORATION, Tokyo (JP)

(72) Inventor: Keiichi Shirasuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/383,781

(22) PCT Filed: Mar. 27, 2013

(86) PCT No.: PCT/JP2013/058963
§ 371 (c)(1),
(2) Date: Sep. 8, 2014

(87) PCT Pub. No.: WO2013/146865
PCT Pub. Date: Oct. 3, 2013

(65) Prior Publication Data
US 2015/0106838 A1    Apr. 16, 2015

(30) Foreign Application Priority Data

Mar. 27, 2012   (JP) .................................. 2012-071013

(51) Int. Cl.
*H04N 7/167*     (2011.01)
*H04N 21/435*    (2011.01)
(Continued)

(52) U.S. Cl.
CPC ............. *H04N 21/435* (2013.01); *H04H 60/23* (2013.01); *H04L 9/0822* (2013.01);
(Continued)

(58) Field of Classification Search
CPC ............ H04N 21/435; H04N 21/4343; H04N 21/6336; H04N 21/44231; H04N 21/4405; H04N 21/4623
USPC .......................................................... 725/31
See application file for complete search history.

(56) References Cited

U.S. PATENT DOCUMENTS 5,029,014 A * 7/1991 Lindstrom ........... G11B 27/002
                                              348/E7.024
5,590,195 A * 12/1996 Ryan ..................... G06Q 40/00
                                              348/E5.123
(Continued)

FOREIGN PATENT DOCUMENTS

JP    11-155139 A    6/1999
JP    11-168729 A    6/1999
(Continued)

*Primary Examiner* — Nasser Goodarzi
*Assistant Examiner* — Michael B Pierorazio
(74) *Attorney, Agent, or Firm* — Birch, Stewart, Kolasch & Birch, LLP

(57) ABSTRACT

A digital broadcast receiver device (100) is provided with: a descrambling unit (504) which uses keys for a plurality of services to decrypt encrypted video data for the plurality of services and generates video data for the plurality of services; and a CAS control unit (503) which, for each of the plurality of services, measures the update period of the key information and the key processing time for generating keys from the key information and determines, from among the plurality of services, which services are to be descrambled, that is, to be decrypted by the descrambling unit (504), selecting services such that the sum of the key processing times of all services to be decrypted is less than each one of the update periods of the services to be decrypted.

19 Claims, 28 Drawing Sheets

(51) Int. Cl.
  *H04H 60/23* (2008.01)
  *H04N 21/4623* (2011.01)
  *H04L 9/08* (2006.01)
  *H04N 21/4405* (2011.01)
  *H04N 21/442* (2011.01)
  *H04N 21/434* (2011.01)
  *H04N 21/6336* (2011.01)

(52) U.S. Cl.
  CPC ...... *H04N 21/4343* (2013.01); *H04N 21/4405* (2013.01); *H04N 21/44231* (2013.01); *H04N 21/4623* (2013.01); *H04N 21/6336* (2013.01); *H04L 2209/601* (2013.01)

(56) References Cited

U.S. PATENT DOCUMENTS

| | | | | |
|---|---|---|---|---|
| 5,600,366 A * | 2/1997 | Schulman | H04N 7/165 | 348/E7.063 |
| 5,619,274 A * | 4/1997 | Roop | G04G 15/006 | 348/461 |
| 5,659,350 A * | 8/1997 | Hendricks | H04H 20/42 | 348/E5.002 |
| 5,774,170 A * | 6/1998 | Hite | G06Q 30/02 | 348/E7.036 |
| 5,805,974 A * | 9/1998 | Hite | H04H 20/18 | 348/E7.063 |
| 5,815,671 A * | 9/1998 | Morrison | H04H 20/106 | 348/E7.024 |
| 5,835,487 A * | 11/1998 | Campanella | H04B 7/18523 | 370/316 |
| 5,886,995 A * | 3/1999 | Arsenault | H04B 7/18523 | 348/384.1 |
| 5,889,950 A * | 3/1999 | Kuzma | H04N 7/165 | 348/461 |
| 5,920,702 A * | 7/1999 | Bleidt | G06F 17/30067 | 707/E17.01 |
| 5,978,649 A * | 11/1999 | Kahn | H04N 7/165 | 348/E7.063 |
| 6,002,393 A * | 12/1999 | Hite | H04N 21/44222 | 348/E7.063 |
| 6,029,045 A * | 2/2000 | Picco | H04N 7/165 | 348/E5.002 |
| 6,035,038 A * | 3/2000 | Campinos | G06Q 20/341 | 235/380 |
| 6,035,397 A * | 3/2000 | Campinos | H04N 7/1675 | 348/E7.056 |
| 6,105,060 A * | 8/2000 | Rothblatt | H04B 7/18584 | 709/219 |
| 6,141,530 A * | 10/2000 | Rabowsky | H04N 7/17345 | 348/436.1 |
| 6,157,719 A * | 12/2000 | Wasilewski | H04L 63/04 | 348/E5.004 |
| 6,160,989 A * | 12/2000 | Hendricks | H04H 20/10 | 348/E5.002 |
| 6,330,334 B1 * | 12/2001 | Ryan | G11B 20/00086 | 348/E5.123 |
| 6,330,719 B1 * | 12/2001 | Zigmond | H04L 29/06 | 348/E7.071 |
| 6,473,137 B1 * | 10/2002 | Godwin | H04N 5/4401 | 348/725 |
| 6,546,556 B1 * | 4/2003 | Kataoka | H04N 7/088 | 348/465 |
| 7,240,113 B1 * | 7/2007 | Barry | H04N 7/1675 | 348/E5.004 |
| 7,552,457 B2 * | 6/2009 | Van De Ven | H04N 7/163 | 380/210 |
| 7,702,589 B2 * | 4/2010 | Candelore | G06F 21/6218 | 380/201 |
| 2001/0003846 A1 * | 6/2001 | Rowe | G11B 27/031 | 725/47 |
| 2001/0004733 A1 * | 6/2001 | Eldering | G06Q 20/20 | 705/14.41 |
| 2001/0014970 A1 * | 8/2001 | Kamperman | H04N 21/4181 | 725/31 |
| 2002/0003884 A1 * | 1/2002 | Sprunk | H04N 7/1675 | 380/239 |
| 2002/0035730 A1 * | 3/2002 | Ollikainen | H04L 12/1836 | 725/93 |
| 2002/0035731 A1 * | 3/2002 | Plotnick | H04H 60/04 | 725/146 |
| 2002/0056102 A1 * | 5/2002 | Dillon | H04N 7/17345 | 725/39 |
| 2002/0107940 A1 * | 8/2002 | Brassil | H04N 21/222 | 709/219 |
| 2002/0144260 A1 * | 10/2002 | Devara | H04N 21/2221 | 725/32 |
| 2002/0166120 A1 * | 11/2002 | Boylan, III | H04N 5/44543 | 725/35 |
| 2003/0070169 A1 * | 4/2003 | Beyers, II | H04N 7/17318 | 725/51 |
| 2003/0110499 A1 * | 6/2003 | Knudson | G06Q 30/0241 | 725/42 |
| 2003/0126594 A1 * | 7/2003 | Tsuria | H04N 7/165 | 725/25 |
| 2007/0073945 A1 * | 3/2007 | Barry | H04N 21/43615 | 710/72 |
| 2007/0172196 A1 * | 7/2007 | Kusunoki | H04N 5/782 | 386/297 |
| 2008/0137848 A1 * | 6/2008 | Kocher | G06F 21/10 | 380/201 |
| 2008/0313463 A1 * | 12/2008 | Depietro | H04N 7/1675 | 713/170 |
| 2009/0083780 A1 * | 3/2009 | Beyabani | H04N 7/17318 | 725/14 |
| 2009/0158321 A1 * | 6/2009 | Hanada | H04N 21/235 | 725/34 |
| 2012/0250861 A1 * | 10/2012 | Ishii | H04N 21/4181 | 380/210 |
| 2013/0051476 A1 * | 2/2013 | Morris | H04N 19/132 | 375/240.24 |
| 2014/0298028 A1 * | 10/2014 | Takashima | H04L 9/0822 | 713/171 |

FOREIGN PATENT DOCUMENTS

| | | |
|---|---|---|
| JP | 2000-295202 A | 10/2000 |
| JP | 2002-325240 A | 11/2002 |
| JP | 2006-041981 A | 2/2006 |
| JP | 2006-345169 A | 12/2006 |
| JP | 2009-212588 A | 9/2009 |
| JP | 2009-212958 A | 9/2009 |
| JP | 2010-011207 A | 1/2010 |
| JP | 2010-011208 A | 1/2010 |
| JP | 2010-050644 A | 3/2010 |
| JP | 2011-109311 A | 6/2011 |
| JP | 2012-009997 A | 1/2012 |
| JP | 2012-142677 A | 7/2012 |

\* cited by examiner

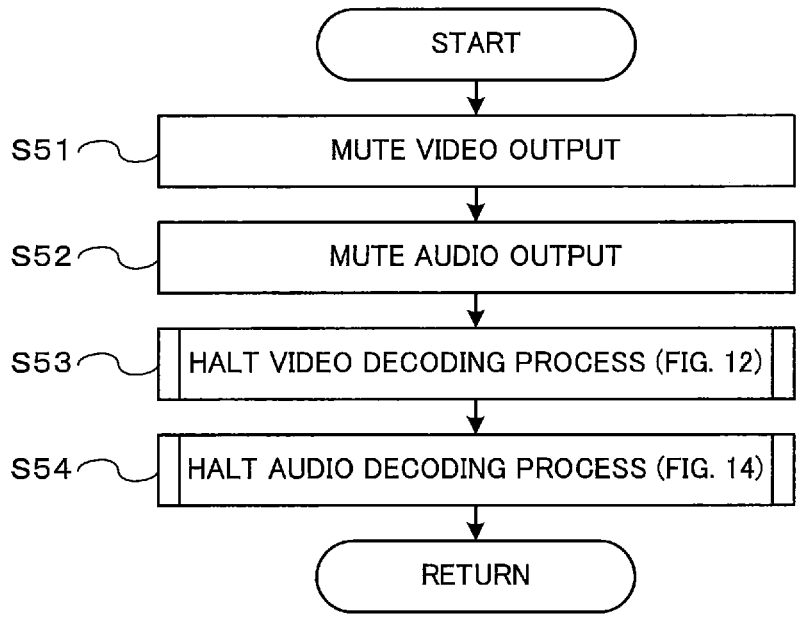
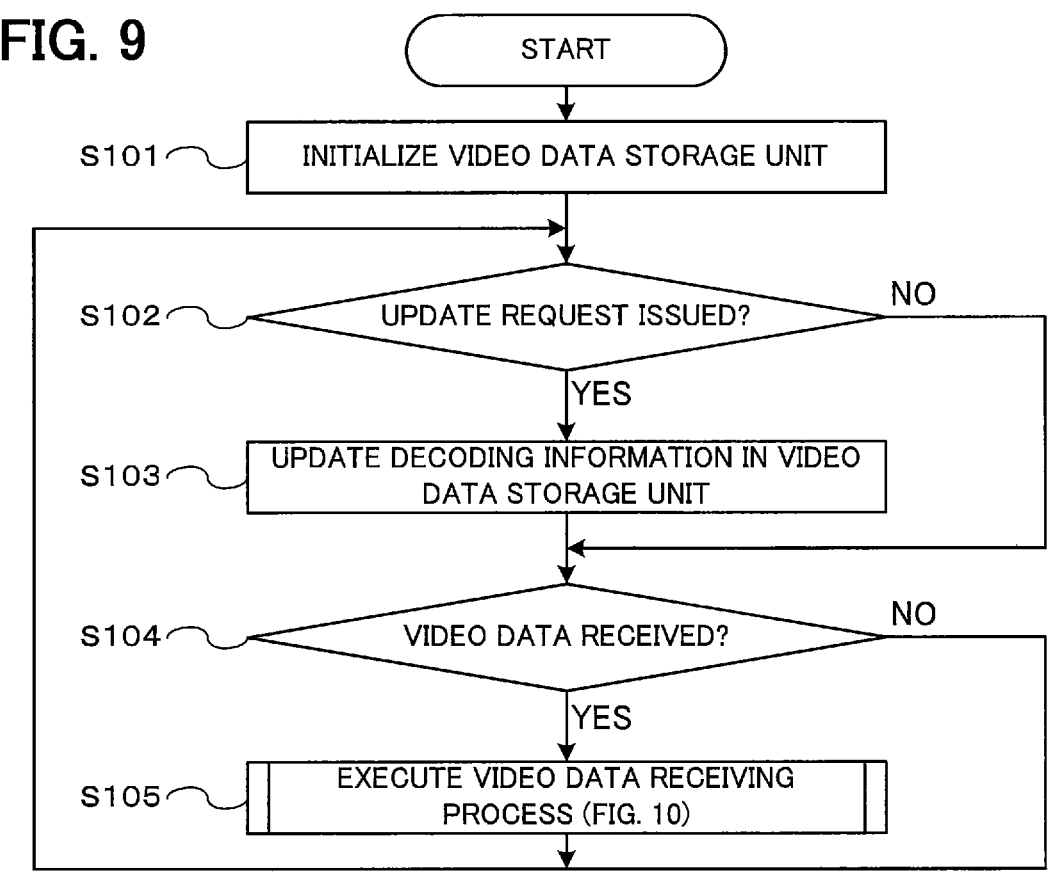

| SERVICE ID | DESCRAMBLING KEY |
|---|---|
| 0x2345 | Ks1 |
| 0xA9E6 | Ks2 |
| 0x1B73 | Ks3 |
| ⋮ | ⋮ |
| 0x8DC0 | KsN |

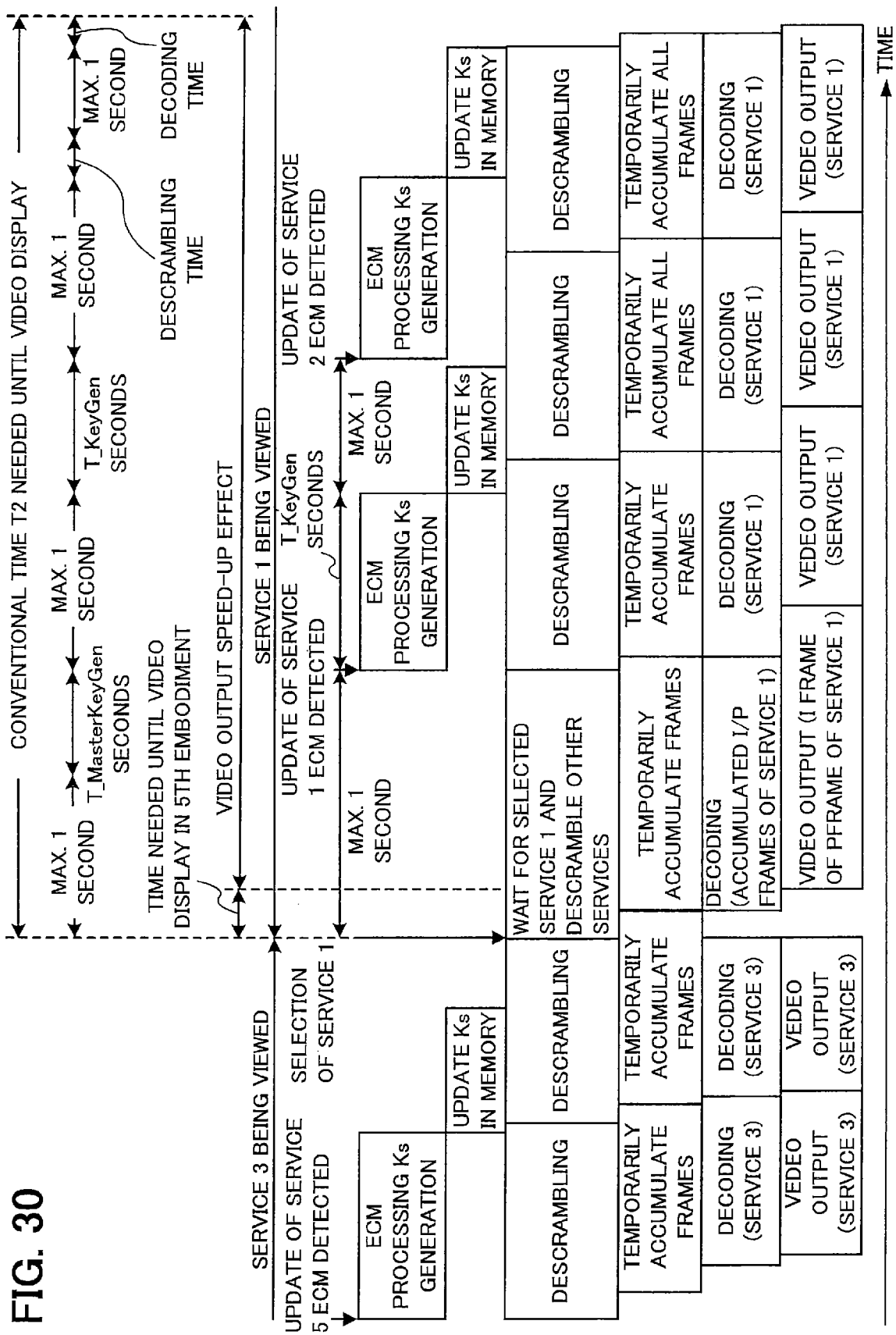

DIGITAL BROADCAST RECEIVER DEVICE AND DIGITAL BROADCAST RECEIVING METHOD

TECHNICAL FIELD

The present invention relates to a digital broadcast receiver device and a digital broadcast receiving method.

BACKGROUND ART

Encoding systems such as MPEG-2 (Moving Picture Experts Group 2) video, H.264, and the like have been adopted in digital broadcasting. Since picture encoding is carried out by use of picture-to-picture prediction in these systems, decoding of the encoded video data cannot start from a picture in an arbitrary position; decoding can only start from pictures in particular positions. A picture at which decoding can start will be referred to as a key picture below. Specific examples of key pictures include I-pictures (Intra pictures) in MPEG-2 video and IDR pictures (Instantaneous Decoder Refresh pictures) in H.264. A problem with digital broadcasting is that since video data cannot be decoded during the interval from the execution of a service selection operation performed by the user to the acquisition of a key picture, there is necessarily a long elapse of time from execution of the service selection operation until the start of video picture display.

A technique for shortening the time needed from execution of the service selection operation to the start of video picture display is disclosed in, for example, patent reference 1. The receiver described in patent reference 1 has a first receiver that receives compressed video data corresponding to a selected channel, a second receiver that receives self-contained and compressed still image data, a storage unit that stores a plurality of self-contained and compressed still image data that have been received by the second receiver, an acquisition unit that, after a switch to a new channel, acquires self-contained and compressed still image data corresponding to the channel from the storage unit, and a display controller that decodes the self-contained and compressed still image data acquired by the acquisition unit and displays the decoded image on a display device until the compressed video data corresponding to the channel received by the first receiver after the channel switch can be decoded and displayed on the display device.

PRIOR ART REFERENCES

Patent References

Patent reference 1: JP 2010-50644 (abstract, FIG. 2)

SUMMARY OF THE INVENTION

Problems to be Solved by the Invention

In the receiver described in patent reference 1, however, only self-contained key pictures can be acquired and stored in the storage unit prior to station selection, so during the interval from the station selection operation performed by the user until the first key picture is acquired, a still key picture that was acquired before station selection remains on display; a moving picture cannot be displayed.

The present invention addresses the above problem of the prior art with the object of shortening the time during which a still picture is displayed after a station selection operation and reducing the time needed until display of a moving picture can begin.

Means for Solving the Problem

A digital broadcast receiver device according to an embodiment of the invention includes a tuner unit for demodulating a broadcast signal on a selected physical channel and outputting a stream obtained by demodulation, a demultiplexer unit for extracting encrypted video data and key information for a plurality of services included in the stream, a CAS control unit for generating keys for decoding the encrypted video data of the plurality of services for each of the plurality of services on a basis of the key information, a descrambling unit for using the keys of the plurality of services to decrypt the encrypted video data of the plurality of services and generate video data for the plurality of services, and a video decoding unit for decoding and outputting the video data for one of the plurality of services. The CAS control unit further comprises a CAS module for generating the keys from the key information, a key storage unit for storing the keys generated by the CAS module in correspondence to the services, a descrambling control unit for setting the keys stored in the key storage unit in the descrambling unit, an update period measurement unit for measuring the update period of the key information for each of the plurality of services, a key processing time measurement unit for measuring the key processing time taken to generate the keys from the key information, for each of the plurality of services, and a service determination unit for determining, from among the plurality of services, the services to be decrypted and thus descrambled in the descrambling unit, such that the total key processing time of all of the services to be decrypted is less than each one of the update periods of the services to be decrypted.

A digital broadcast receiving method according to an embodiment of the invention includes a tuning step for demodulating a broadcast signal on a selected physical channel, and outputting a stream obtained by demodulation, a demultiplexing step for extracting encrypted video data and key information for a plurality of services included in the stream, a CAS control step for generating keys for decoding the encrypted video data of the plurality of services for each of the plurality of services on a basis of the key information of the plurality of services, a descrambling step for using the keys of the plurality of services to decrypt the encrypted video data of the plurality of services and generate video data for the plurality of services, and a video decoding step for decoding and outputting the video data for one of the plurality of services. The CAS control step further comprises a key generating step for generating the keys from the key information, a key storage step for storing the keys generated by the CAS module in correspondence to the services, a descrambling control unit step for setting the keys stored in the key storage step as key for use in the descrambling step, an update period measurement step for measuring the update period of the key information for each of the plurality of services, a key processing time measurement step for measuring the key processing time taken to generate the keys from the key information, for each of the plurality of services, and a service determination step for determining, from among the plurality of services, the services to be decrypted and thus descrambled in the descrambling step, such that the total key processing time of all of the services to be decrypted is less than each one of the update periods of the services to be decrypted.

Effects of the Invention

According to an embodiment of the invention, the time during which a still picture is displayed after a station selection operation and the time needed until display of a moving picture can begin can be shortened.

BRIEF DESCRIPTION OF THE DRAWINGS

FIG. 8 is a flowchart showing an example of the station selection halt process shown in FIG. 6.

FIG. 9 is a flowchart showing an example of the video data rewrite process shown in FIG. 7.

FIG. 24 schematically illustrates descrambling key management information in the fifth embodiment.

FIG. 30 schematically illustrates the time necessary until video output following a station selection operation when the EMM has been updated in a digital broadcast receiver device according to the fifth embodiment.

MODE FOR CARRYING OUT THE INVENTION

First Embodiment

Figure 1:
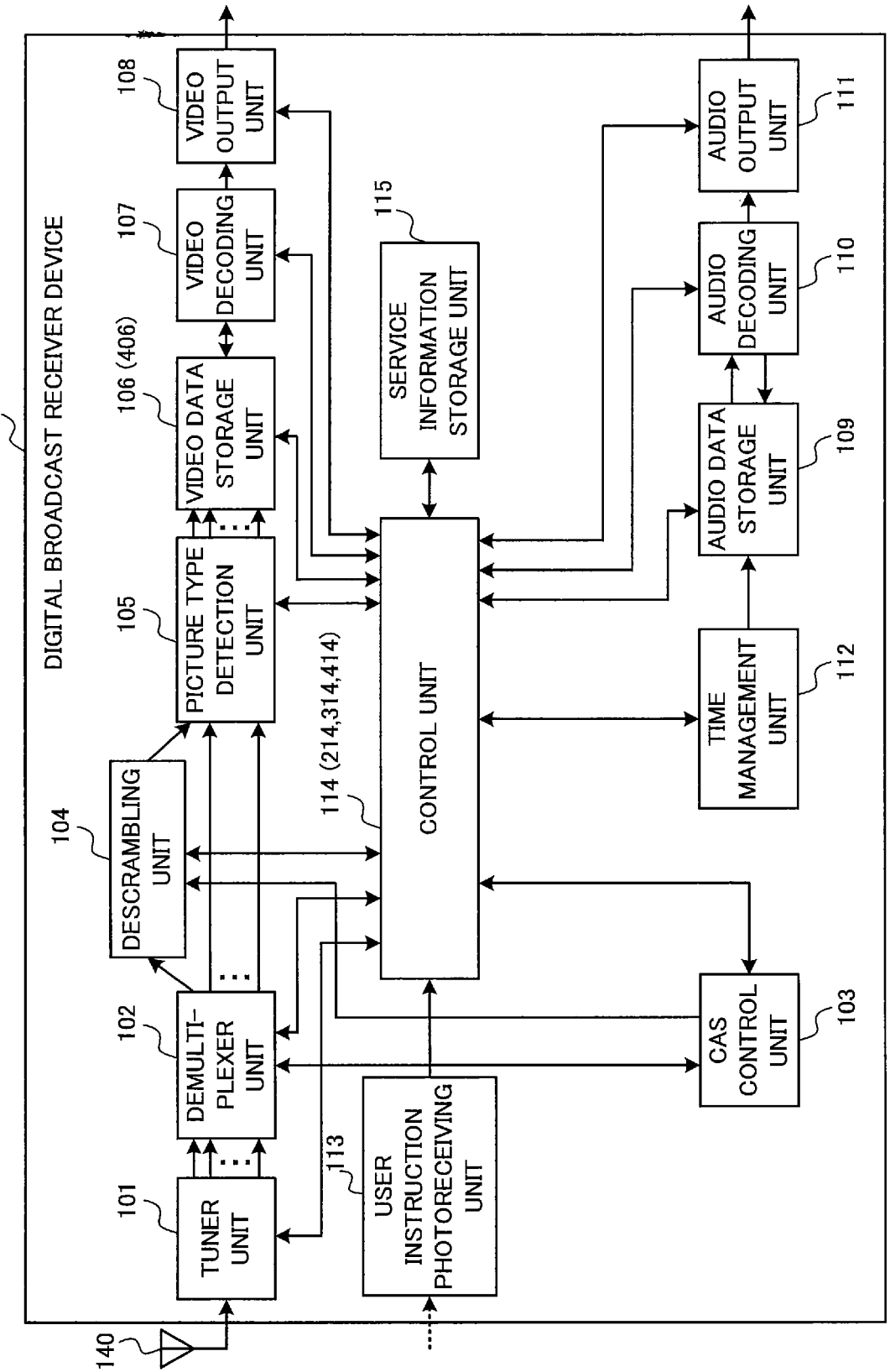
FIG. 1 is a block diagram schematically showing an example of the configuration of a digital broadcast receiver device according to first to fourth embodiments of the invention.

FIG. 1 is a block diagram schematically showing an example of the configuration of a digital broadcast receiver device 100 according to the first embodiment. As shown in FIG. 1, the digital broadcast receiver device 100 according to the first embodiment has a tuner unit 101, a demultiplexer unit 102, a CAS control unit 103, a descrambling unit 104, a picture type detection unit 105, a video data storage unit 106, a video decoding unit 107, a video output unit 108, an audio data storage unit 109, an audio decoding unit 110, an audio output unit 111, a time management unit 112, a user instruction photoreceiving unit 113, a control unit 114, and a service information storage unit 115. The structure of digital broadcast receiver devices 100 to which the present invention is applicable is not, however, limited to the example in FIG. 1. The reference characters in parentheses in FIG. 1 apply to the second to fourth embodiments.

The tuner unit 101 receives a digital broadcast signal supplied from an antenna unit 140, extracts the signal on a particular physical channel from the received digital broadcast signal, and demodulates the extracted signal and corrects errors to generate a stream. Which physical channel in the digital broadcast signal supplied from the antenna unit 140 the tuner unit 101 extracts the signal from is controlled by the control unit 114. Stream data for a plurality of services may be included in one physical channel. The tuner unit 101 can output stream data for a plurality of services included in one physical channel simultaneously. In the digital broadcast receiver device 100 shown in FIG. 1, there are multiple stream output paths from the single tuner unit 101 to the demultiplexer unit 102, but the digital broadcast receiver device may be structured for output of multiple stream data by, for example, providing a plurality of tuner units 101.

The demultiplexer unit 102 extracts audio data, video data, and time information from the stream supplied by the tuner unit 101, and outputs them. If the stream supplied by the tuner unit 101 is scrambled, the video data extracted by the demultiplexer unit 102 are encrypted video data that have been encrypted. The time information here is information for recovering the reference time of the digital broadcast transmitter device at the receiver device; a specific example is the PCR (Program Clock Reference) of an MPEG-2 TS. If no information for recovering the reference time of the digital broadcast transmitter device at the receiver device is present in the stream, other information may be treated as time information. In a stream with the MFS (Multiplex Frame Structure) used in digital broadcasting under the CMMB (China Multimedia Mobile Broadcasting) standard, which is a broadcasting system used in China, for example, the following information in the MFS stream format, given below in Chinese characters (INF1), may be treated as time information.

起始播放时间 (Chinese Characters) (INF1)

The demultiplexer unit 102 can extract video data for a plurality of services included in a stream simultaneously. Concerning audio data and time information, the demultiplexer unit 102 can extract audio data for a single service and time information for a single service. Which video data, audio data, and time information are extracted from the stream is controlled by the control unit 114.

If a service is scrambled, the demultiplexer unit 102 extracts from the stream supplied from the tuner unit 101 an EMM that carries a master key (Km) for obtaining a scrambling key and an ECM that carries an encrypted scrambling key (Ks). The demultiplexer unit 102 supplies the extracted EMM and ECM to the CAS control unit 103. The EMM and ECM here are key information containing information required to generate keys (master and scrambling keys) used to decrypt scrambled (encrypted) stream data.

The CAS control unit 103 first generates a Km from the EMM extracted by the demultiplexer unit 102 and uses the Km to generate a Ks from the ECM. The CAS control unit 103 then sets the Ks in the descrambling unit 104.

The descrambling unit 104 uses the Ks set by the CAS control unit 103 to decrypt the audio data or video data, or both, supplied from the demultiplexer unit 102 and outputs the decrypted data. The audio and video data that have not yet been decrypted by the descrambling unit 104 are encrypted audio data and encrypted video data. For a digital broadcast standard that does not employ scrambling, the descrambling unit 104 may be omitted and the output of the demultiplexer unit 102 may be supplied directly to the picture type detection unit 105. The descrambling unit 104 can decrypt encrypted data for a plurality of services simultaneously. In this embodiment, data for services other than the service to be viewed are supplied from the demultiplexer unit 102 to the picture type detection unit 105.

The picture type detection unit 105 detects the picture type of the video data supplied from the demultiplexer unit 102 or descrambling unit 104 and outputs the video data and picture type information. The picture types detected by the picture type detection unit 105 include reference pictures and non-reference pictures. Reference pictures include key pictures and reference pictures other than key pictures. The reference pictures here are pictures referred to when other pictures are decoded; specific examples include I-pictures and P-pictures (predicted pictures) in MPEG-2 video and pictures that do not satisfy nal_def_idc=0 in H.264. Specific examples of reference pictures other than key pictures include P-pictures in MPEG-2 video and pictures that are not IDR pictures and do not satisfy nal_def_idc=0 in H.264. Key pictures are always reference pictures. Non-reference pictures are pictures that are not referred to in the decoding of other pictures; specific examples include B-pictures (bidirectionally predicted pictures) in MPEG-2 video and pictures that satisfy nal_def_idc=0 in H.264. The picture type detection unit 105 can detect the picture types of video data for a plurality of services simultaneously.

Figure 2:
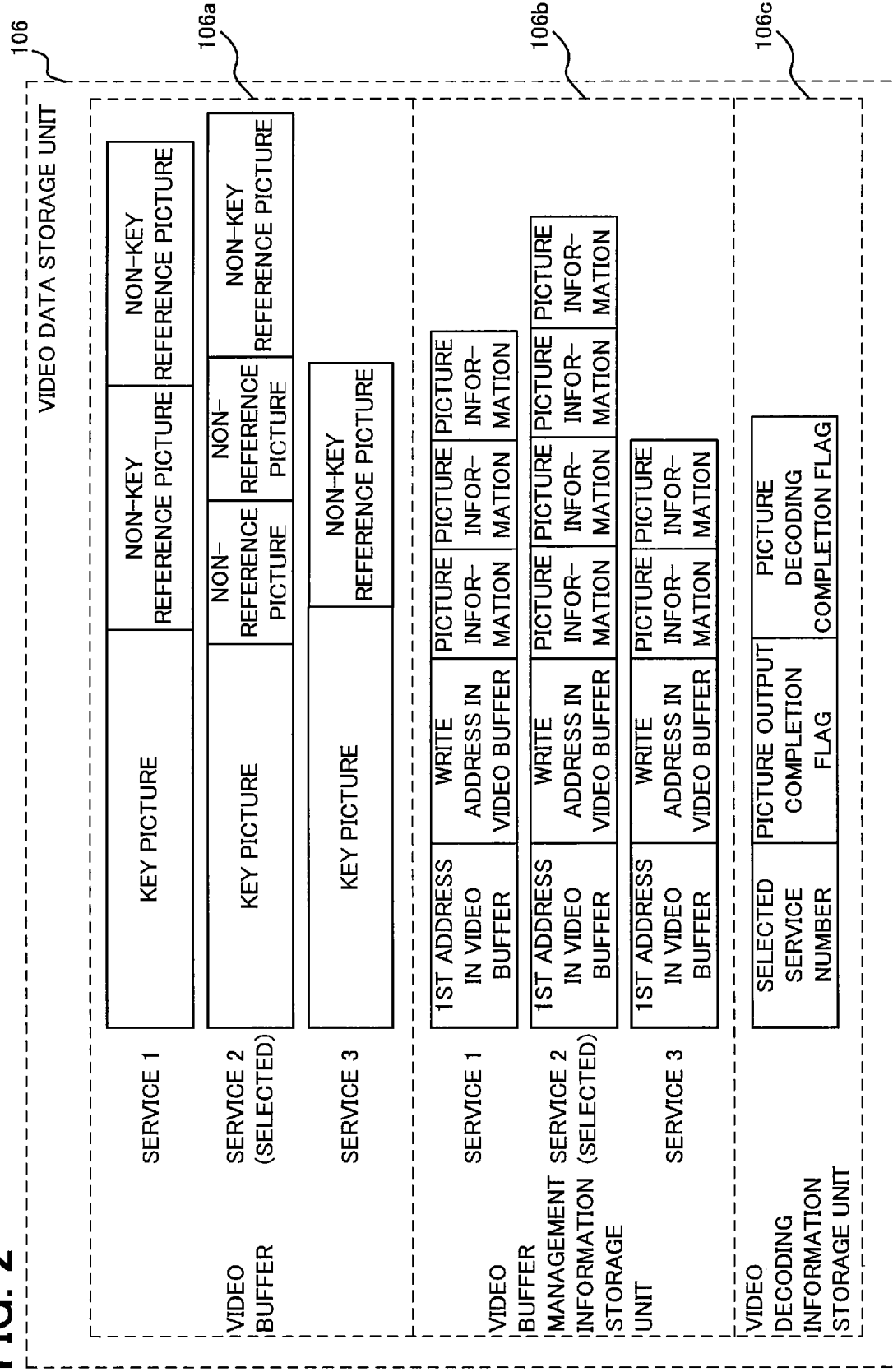
FIG. 2 is a diagram showing an example of the data format in the video data storage unit shown in FIG. 1.

The video data storage unit 106 stores the video data and picture type information supplied from the picture type detection unit 105. The video data storage unit 106 can store the video data for a plurality of services. FIG. 2 shows an example of the data format in the video data storage unit 106. The video data storage unit 106 includes a video buffer 106a, a video buffer management information storage unit 106b, and a video decoding information storage unit 106c.

The video buffer 106a stores video data for individual services: reference pictures and non-reference pictures for the currently selected service, and just reference pictures for services other than the currently selected service. For each service, the video buffer management information storage unit 106b stores its first address in the video buffer, a write address in the video buffer, and picture information for all pictures stored in the video buffer. The picture information includes the first address, data length, picture type, display time stamp, decode time stamp, and so on of each picture. The display time stamp here is information indicating the timing at which the picture is displayed; specific examples include the PTS (presentation time stamp) of a PES (packetized elementary stream) in the MPEG-2 system and a value obtained by adding the value of an item given below in Chinese characters (INF3) in the MFS stream format used in digital broadcasting under the CMMB standard to the value of another item given below in Chinese characters (INF2) in the MFS stream format.

相对播放时间 (Chinese characters) (INF2)
相对播放时间 (Chinese characters) (INF3)

A decode time stamp is information indicating the timing at which the picture is decoded; specific examples include the DTS (decoding time stamp) of a PES in the MPEG-2 system. If a stream includes just display time stamps and does not include decode time stamps, the same value as the display time stamp is used as the decode time stamp. For example, since an MFS stream does not include information corresponding to a decode time stamp, the same value as the display time stamp is used as the decode time stamp. The video decoding information storage unit 106c stores the number of the currently selected service, a picture output completion flag, and a picture decoding completion flag.

The video decoding unit 107 acquires video data from the video data storage unit 106 and decodes the video data. When decoding finishes normally and there is a picture to be output, the video decoding unit 107 outputs the picture. In the example shown in FIG. 1, the video decoding unit 107 can decode the video data of one service at a time. If the order in which pictures are decoded differs from the order in which the pictures are to be displayed, the video decoding unit 107 outputs the pictures in the order in which they are to be displayed.

Figure 3:
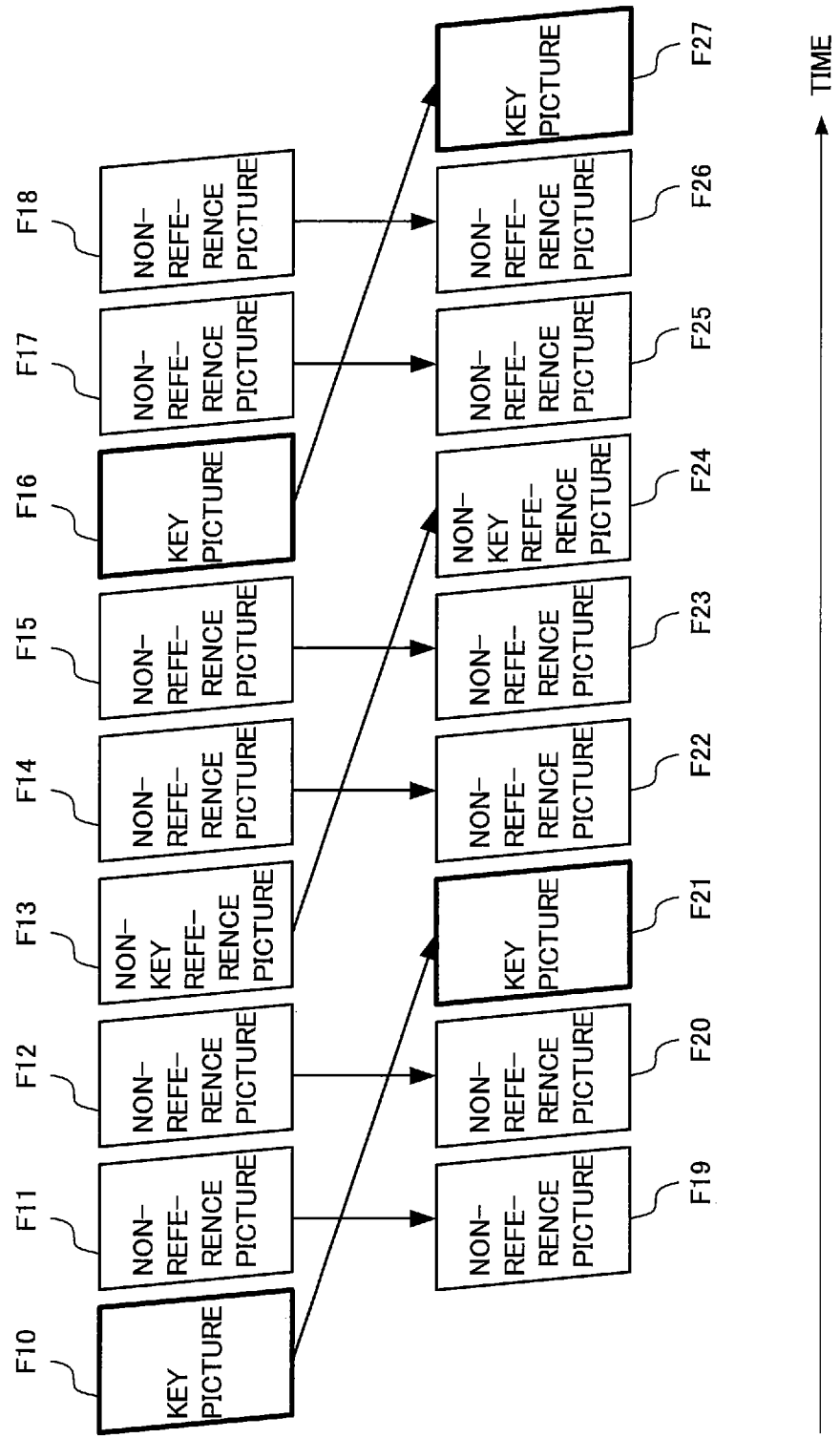
FIG. 3 is a diagram representing the order in which pictures are decoded by the video decoding unit and the order in which they are output when the video data are MPEG-2 video data.

FIG. 3 is a diagram representing the order in which pictures are decoded by the video decoding unit 107 and the order in which they are output when the video data are MPEG-2 video data. In FIG. 3, pictures F10 to F18 represent pictures arranged in the order in which they are decoded, and pictures F19 to F27 represent pictures arranged in the order in which they are output after being decoded. Pictures F10 and F16 represent key pictures before decoding; pictures F11, F12, F14, F15, F17, and F18 represent non-reference pictures before decoding; picture F13 represents a reference picture other than a key picture before decoding; pictures F19, F20, F22, F23, F25, and F26 represent non-reference pictures output as a result of decoding; pictures F21 and F27 represent key pictures output as a result of decoding; picture F24 represents a reference picture other than a key picture output as a result of decoding. As shown in FIG. 3, when the video data are MPEG-2 video data, the video decoding unit 107 outputs non-reference pictures when they are decoded. Reference pictures are not output when they are decoded; a reference picture is output when the next reference picture is decoded.

Figure 4:
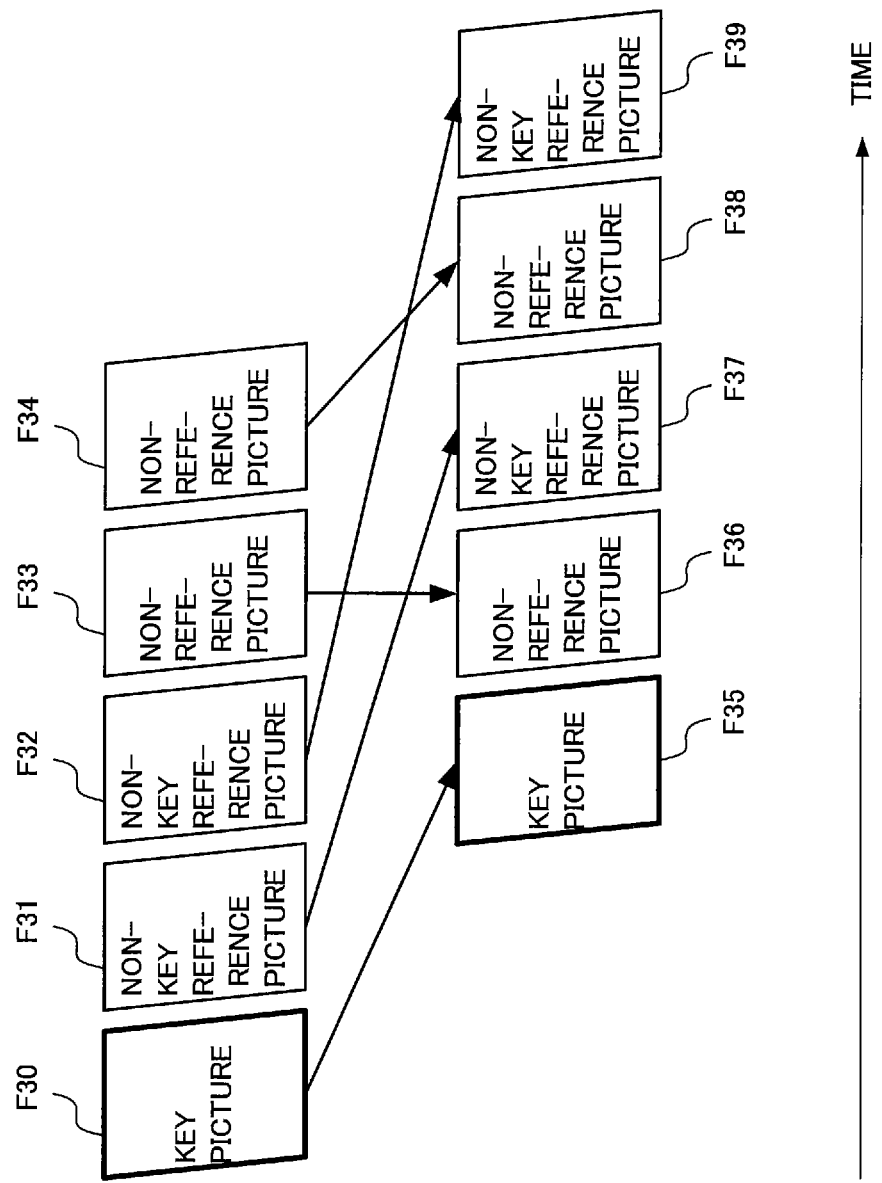
FIG. 4 is a diagram representing the order in which pictures are decoded by the video decoding unit and the order in which they are output when the video data are H.264 video data.

FIG. 4 is a diagram representing the order in which pictures are decoded by the video decoding unit 107 and the order in which they are output when the video data are H.264 video data. In FIG. 4, pictures F30 to F34 represent pictures arranged in the order in which they are decoded, and pictures F35 to F39 represent pictures arranged in the order in which they are output as a result of decoding. Picture F30 represents a key picture before decoding; pictures F31 and F32 represent reference pictures other than key pictures before decoding; pictures F33 and F34 represent non-reference pictures before decoding; picture F35 represents a key picture output as a result of decoding; pictures F36 and F38 represent non-reference pictures output as a result of decoding; pictures F37 and F39 represent non-key reference pictures (reference pictures other than key pictures) output as a result of decoding. As shown in FIG. 4, when the video data are H.264 video data, not only reference pictures but also non-reference pictures may have output timings that differ from their decode timings in the video decoding unit 107. The pictures are re-ordered in accordance with their POC (picture order count).

Since pictures are output in an order differing from the order in which the pictures have been decoded, when decoding finishes normally, the picture that has just been decoded is not necessarily output immediately; a picture that was decoded earlier may be output instead. When decoding does not finish normally, no pictures are output.

The video output unit 108 converts the video information output from the video decoding unit 107 into a video signal format that can be received by an external display (not shown) and outputs the converted video signal to the external display.

Figure 5:
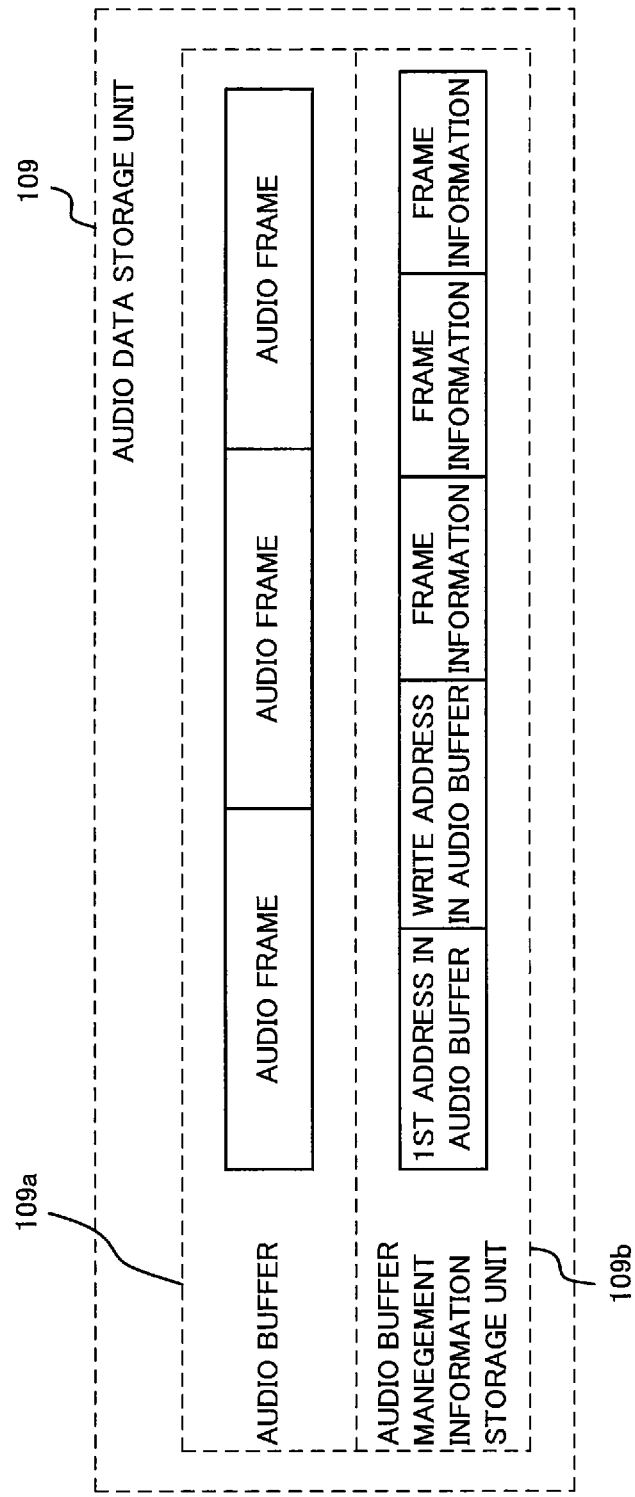
FIG. 5 is a diagram showing an example of the data format in the audio data storage unit shown in FIG. 1.

The audio data storage unit 109 stores audio data supplied from the demultiplexer unit 102 or descrambling unit 104. FIG. 5 shows an example of the data format in the audio data storage unit 109. The audio data storage unit 109 includes an audio buffer 109a and an audio buffer management information storage unit 109b. The audio buffer 109a can store audio data (audio frames) for a single service. The audio buffer management information storage unit 109b stores the first address of the audio buffer 109a, a write address in the audio buffer 109a, and frame information for all audio frames stored in the audio buffer 109a. The frame information includes the first address, data length, display time stamp, and other information concerning the data in audio frame.

The audio decoding unit 110 acquires audio data from the audio data storage unit 109, decodes the audio data, and outputs decoded audio information. In the example shown in FIG. 1, the audio decoding unit 110 can decode audio data for one service at a time.

The audio output unit 111 converts the audio information output from the audio decoding unit 110 to an audio signal format that can be received by an external speaker (not shown) and outputs the audio signal to the external speaker.

The time management unit 112 manages the internal time of the digital broadcast receiver.

The user instruction photoreceiving unit 113 receives a station selection instruction (a light signal, for example) from a remote control unit operated by the user and passes the instruction information to the control unit 114. The user instruction photoreceiving unit 113 is not always necessary; it may be replaced by a user operated control unit (not shown) built into the main body of the digital broadcast receiver device 100 or by some other type of built-in unit for receiving instructions from the user.

When the station selection instruction is received from the user instruction photoreceiving unit 113, the control unit 114 acquires from the service information storage unit 115, which will be described later, information needed to select a service and makes a selection on a basis of the information.

The digital broadcast receiver device 100 according to the first embodiment (a device that can carry out the digital broadcast receiving method according to the first embodiment) includes a tuner unit 101 for demodulating a broadcast signal on a selected physical channel and outputting a stream obtained by demodulation, a demultiplexer unit 102 for extracting video data for a plurality of services included in the stream, a picture type detection unit 105 for determining picture types of video data for the plurality of services and outputting the video data for the plurality of services and picture type information for the video data, a video data storage unit 106, a video decoding unit 107 for decoding and outputting video data for one of the plurality of services, and a control unit 114 for having the video data storage unit 106 store the video data for a currently selected service among the plurality of services and key pictures and other reference pictures of the video data for services other than the currently selected service among the plurality of services. Immediately after a new service other than the currently selected service is selected out of the plurality of services, the control unit 114 has the video decoding unit 107 extract and decode the key pictures of the video data for the new service that were stored in the video data storage unit 106 immediately before the new service was selected and then has the video decoding unit 107 extract and decode reference pictures other than key pictures of the video data for the new service that were stored in the video data storage unit 106 immediately before the new service was selected.

Figure 6:
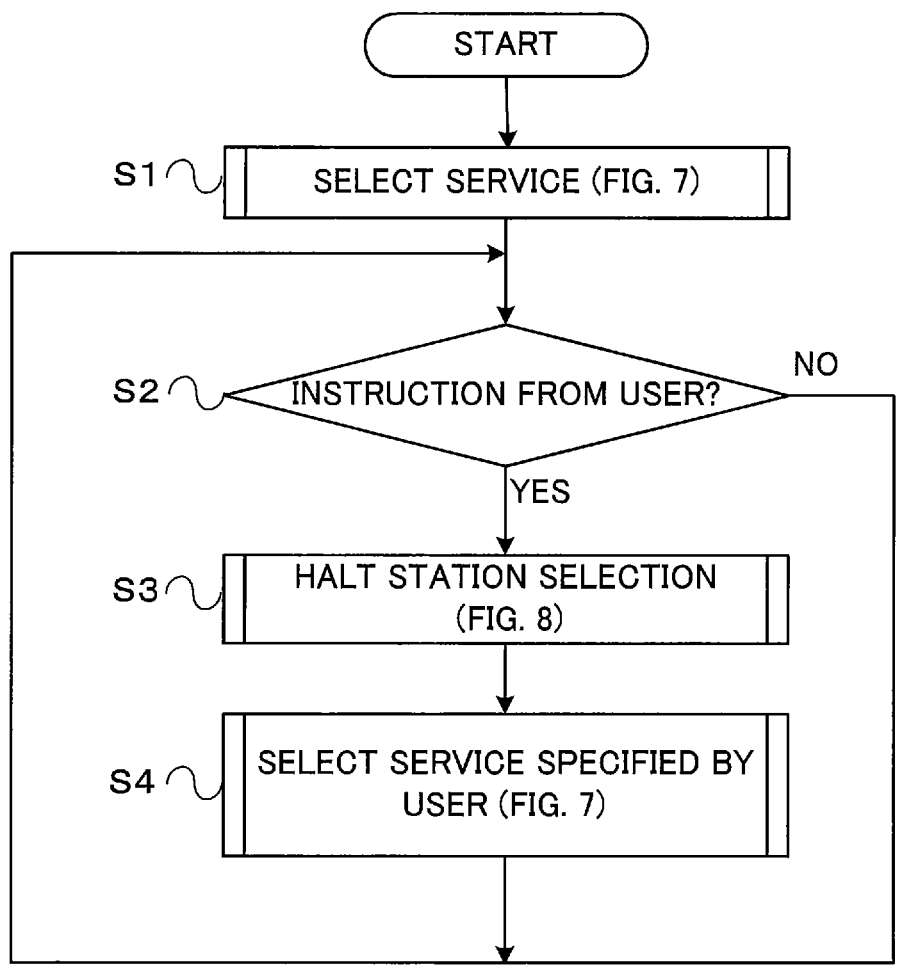
FIG. 6 is a flowchart showing an example of the operation of the digital broadcast receiver device according to the first to fourth embodiments.

FIG. 6 is a flowchart showing the operation of the digital broadcast receiver device 100 according to the first embodiment. The operation illustrated in FIG. 6 starts when the digital broadcast receiver device 100 is powered up. When a service is selected in step S1 after power-up, the control unit 114 proceeds to step S2. Details of the station selection process in step S1 will be described later with reference to the flowchart in FIG. 7.

In step S2, the control unit 114 checks whether there has been a station selection instruction from the user. If there has been a station selection instruction from the user, the control unit 114 proceeds to step S3; if there has not been a station selection instruction from the user, the control unit 114 proceeds to step S2.

In step S3, the control unit 114 halts the station selection process and proceeds to step S4. Details of the processing in step S3 will be described later with reference to the flowchart in FIG. 8.

In step S4, the control unit 114 selects a service specified by the user and proceeds to step S2. Details of the station selection process will be described later with reference to the flowchart in FIG. 7.

Figure 7:
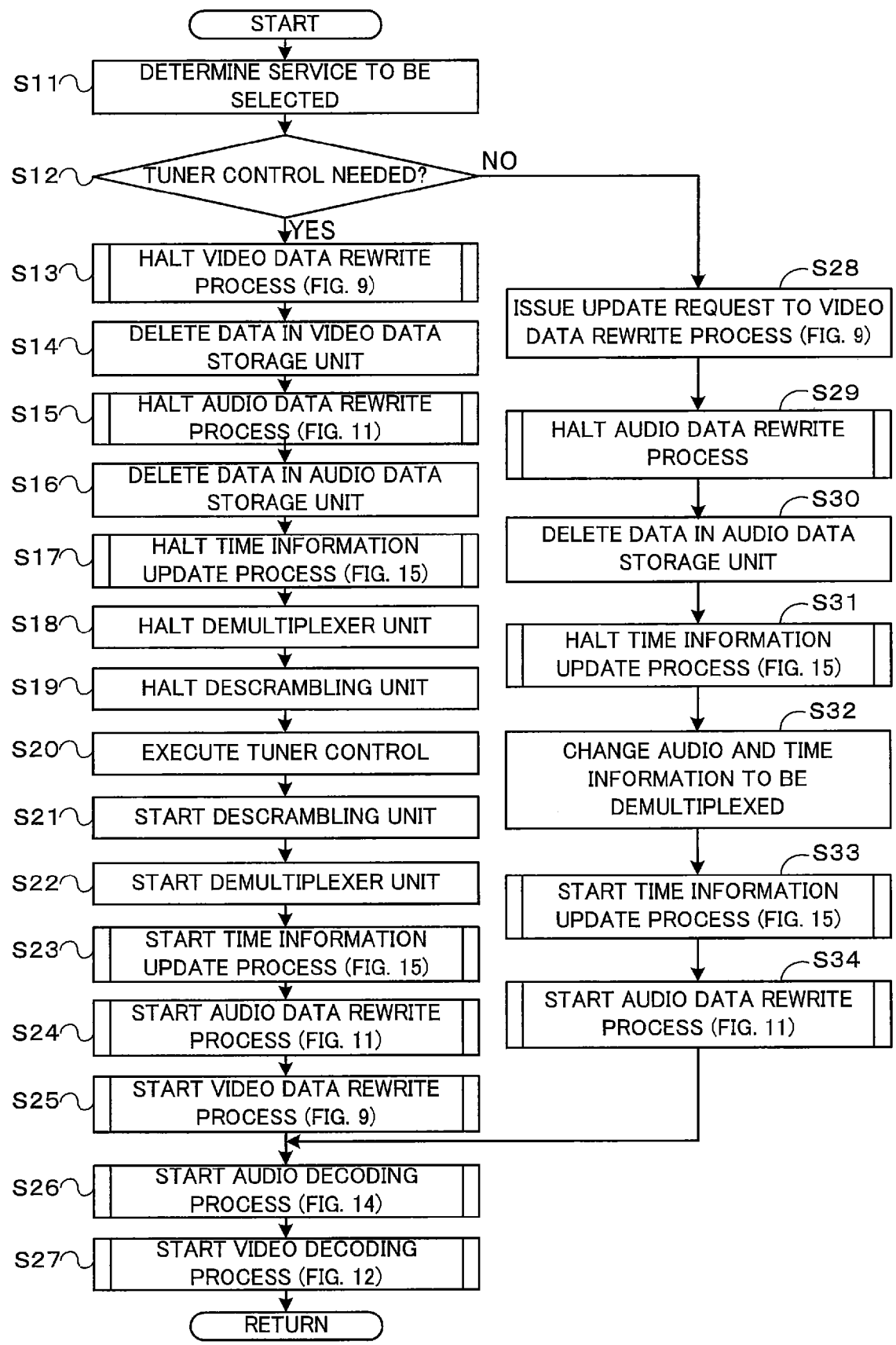
FIG. 7 is a flowchart showing an example of the station selection process shown in FIG. 6.

FIG. 7 is a flowchart showing an example of the station selection process in the digital broadcast receiver device according to the first embodiment. The operation illustrated in FIG. 7 starts when the station selection processes in step S1 and step S4 in FIG. 6 are executed.

In step S11, the control unit 114 determines the service to be selected, acquires the information concerning the service to be selected from the service information storage unit 115, and proceeds to step S12. In the first selection after power-up in step S1 in FIG. 6, the service to be selected is, for example, the last service that was selected before power-down; in a selection in response to a selection instruction from the user in step S4 in FIG. 6, the service to be selected is a service specified by the user by operating the remote control or other control unit.

In step S12, the control unit 114 checks whether tuner control is necessary and, if tuner control is necessary, proceeds to step S13 or, if tuner control is not necessary, proceeds to step S28. In the process of checking whether tuner control is necessary, the physical channel of the previously selected service is compared with the physical channel of the service to be selected next, for example. If the physical channels are different, tuner control is decided to be necessary; if the physical channels are the same, tuner control is decided to be unnecessary. In a broadcast system such as CMMB that uses different modulation parameters for different MFs (multiplex frames) on the same physical channel, tuner control is necessary at a switchover to a different MF.

In step S13, the control unit 114 halts the video data rewrite process and proceeds to step S14. In the video data rewrite process, among the video data output from the demultiplexer unit 102 or descrambling unit 104, the control unit 114 has the video data storage unit 106 store the video data of the currently selected service, including the data of both reference pictures and non-reference pictures; for services other than the currently selected service, the control unit 114 has the video data storage unit 106 store the video data of reference pictures. When a key picture is received in the video data of services other than the currently selected service, the control unit 114 deletes the data of pictures received before the key picture. Details of the video data rewrite process will be described later with reference to the flowchart in FIG. 9.

In step S14, the control unit 114 deletes the data in the video data storage unit 106 and proceeds to step S15.

In step S15, the control unit 114 halts the audio data rewrite process and proceeds to step S16. In the audio data rewrite process, the control unit 114 has the audio data storage unit 109 store the audio data output by the demultiplexer unit 102 or descrambling unit 104. Details of the audio data rewrite process will be described later with reference to the flowchart in FIG. 11.

In step S16, the control unit 114 deletes the data in the audio data storage unit 109 and proceeds to step S17.

In step S17, the control unit 114 halts the time information update process and proceeds to step S18. Details of the time information update process will be described later with reference to the flowchart in FIG. 15.

In step S18, the control unit 114 halts the operation of the demultiplexer unit 102 and proceeds to step S19.

In step S19, the control unit 114 halts the operation of the descrambling unit 104 and proceeds to step S20.

In step S20, the control unit 114 controls the tuner unit 101 to switch to a user-selected physical channel or MF and proceeds to step S21.

In step S21, the control unit 114 starts the operation of the descrambling unit 104 and proceeds to step S22.

In step S22, the control unit 114 starts the operation of the demultiplexer unit 102 and proceeds to step S23.

In step S23, the control unit 114 starts the time information update process and proceeds to step S24. Details of the time information update process will be described later with reference to the flowchart in FIG. 15.

In step S24, the control unit 114 starts the audio data rewrite process and proceeds to step S25. Details of the audio data rewrite process will be described later with reference to the flowchart in FIG. 11.

In step S25, the control unit 114 starts the video data rewrite process and proceeds to step S25. Details of the video data rewrite process will be described later with reference to the flowchart in FIG. 9.

In step S26, the control unit 114 starts the audio decoding process and proceeds to step S27. Details of the audio decoding process will be described later with reference to the flowchart in FIG. 14.

In step S27, the control unit 114 starts the video decoding process and ends the station selection process. Details of the video decoding process will be described later with reference to the flowchart in FIG. 12.

In step S28, the control unit 114 issues an update request, regarding the service specified by the user, to the video data rewrite process and proceeds to step S29. Details of the video data rewrite process will be described later with reference to the flowchart in FIG. 9.

In step S29, the control unit 114 halts the audio data rewrite process for the service specified by the user and proceeds to step S29. Details of the audio data rewrite process will be described later with reference to the flowchart in FIG. 11.

In step S30, the control unit 114 deletes the data for the service selected by the user from the audio data storage unit 109 and proceeds to step S31.

In step S31, the control unit 114 halts the time information update process for the service selected by the user and proceeds to step S32. Details of the time information update process will be described later with reference to the flowchart in FIG. 15.

In step S32, the control unit 114 changes the audio data and time information extracted by the demultiplexer unit 102 to the audio data and time information for the selected service and proceeds to step S33.

In step S33, the control unit 114 starts the time information update process and proceeds to step S34. Details of the time information update process will be described later with reference to the flowchart in FIG. 15.

In step S34, the control unit 114 starts the audio data rewrite process and moves to step S26. Details of the audio data rewrite process will be described later with reference to the flowchart in FIG. 11.

FIG. 8 is a flowchart showing an example of the station selection halt process in the digital broadcast receiver device 100 according to the first embodiment. The operation illustrated in FIG. 8 starts when the station selection halt process is executed in step S3 in FIG. 6.

In step S51, the control unit 114 mutes the video output from the video output unit 108 and proceeds to step S52.

In step S52, the control unit 114 mutes the audio output from the audio output unit 111 and proceeds to step S53.

In step S53, the control unit 114 halts the video decoding process and proceeds to step S54. Details of the video decoding process will be described later with reference to the flowchart in FIG. 12.

In step S54, the control unit 114 halts the audio decoding process and ends the station selection halt process. Details of the audio decoding process will be described later with reference to the flowchart in FIG. 14.

FIG. 9 is a flowchart showing an example of the video data rewrite process in the digital broadcast receiver device 100 according to the first embodiment. The operation illustrated in FIG. 9 starts when the video data rewrite process starts in step S25 shown in FIG. 7. The operation illustrated in FIG. 9 ends when the video data rewrite process is halted by execution of step S13 shown in FIG. 7.

In step S101, the control unit 114 initializes the video data storage unit 106 and proceeds to step S102. In the initialization of the video data storage unit 106, the control unit 114 first specifies the number of the service to be selected as the number of the currently selected service in the decode information, clears the picture output completion flag, and sets the picture decode completion counter to '0'. The control unit 114 specifies the first address of the region storing the data as the read address and write address of the service information of each service. The control unit 114 also deletes all picture information.

In step S102, the control unit 114 checks whether an update request has been issued for the video data rewrite process. The control unit 114 proceeds to step S103 if an update request has been issued, and to step S104 if no update request has been issued. The update request here is the update request to the video data rewrite process shown in step S28 in FIG. 7.

In step S103, the control unit 114 updates the decode information of the video data storage unit 106 and proceeds to step S104. In the updating of the decode information, the control unit 114 sets the number of the service to be selected as the number of the currently selected service, clears the picture output completion flag, and sets the picture decode completion counter to '0'.

In step S104, the control unit 114 checks whether the picture type detection unit 105 has received video data from the demultiplexer unit 102 or descrambling unit 104. The control unit 114 proceeds to step S105 if video data have been received, and to step S102 if video data have not been received.

In step S105, the control unit 114 executes the video data receiving process and proceeds to step S102. Details of the video data receiving process will be described later with reference to the flowchart in FIG. 10.

Figure 10:
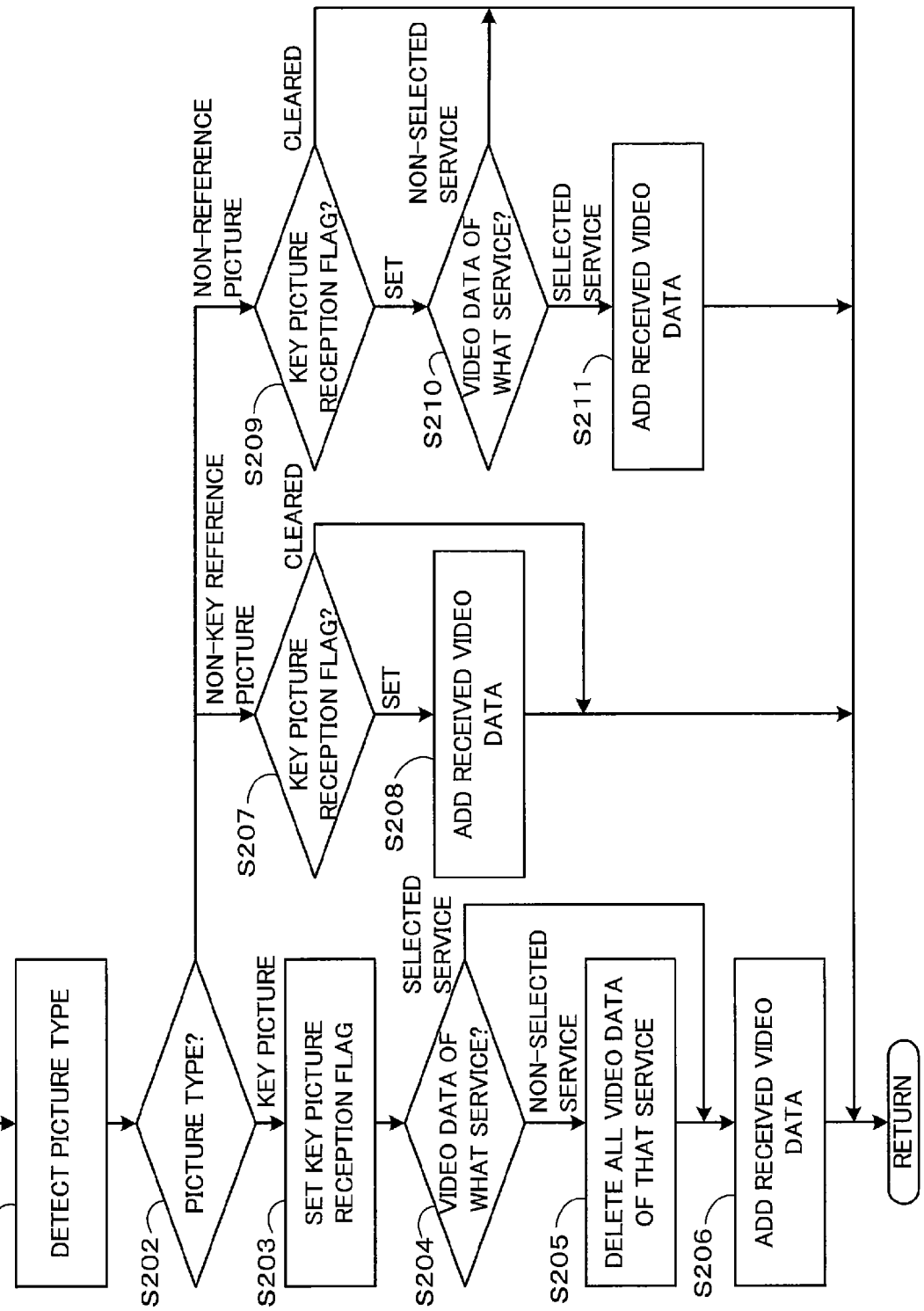
FIG. 10 is a flowchart showing an example of the video data receiving process in digital broadcast receiver devices according to the first to third embodiments.

FIG. 10 is a flowchart showing an example of the video data receiving process in the digital broadcast receiver device 100 according to the first embodiment. The operation illustrated in FIG. 10 starts when the video data receiving process starts in step S105 shown in FIG. 9. In the video data receiving process, key pictures are stored first in the video data storage unit 106; non-reference pictures and reference pictures other than the key pictures are not stored until a key picture has been stored. After a key picture has been stored, all of the video data for the currently selected service are stored, including key pictures, reference pictures other than the key pictures, and non-reference pictures. For services other than the currently selected service, only the video data of the latest key picture and reference pictures other than key pictures that are received after the latest key picture are stored.

In step S201, the control unit 114 has the picture type detection unit 105 detect the picture type of the video data received from the demultiplexer unit 102 or descrambling unit 104 and proceeds to step S202.

In step S202, the control unit 114 determines the subsequent processing depending on the picture type obtained in step S201. If the picture is a key picture, the control unit 114 proceeds to step S203; if the picture is a reference picture other than a key picture, the control unit 114 proceeds to step S207; if the picture is a non-reference picture, the control unit 114 proceeds to step S209.

In step S203, the control unit 114 sets a key picture reception flag in the video data storage unit 106 and proceeds to step S204.

In step S204, the control unit 114 determines which service the video data belong to. If the service to which the video data belong is not the currently selected service, the control unit 114 proceeds to step S205; if the service to which the video data belong is the currently selected service, the control unit 114 proceeds to step S206.

In step S205, the control unit 114 deletes all the video data stored for the same service as the received video data from the video data storage unit 106 and proceeds to step S206. The data deletion process is carried out by, for example, specifying the first address of the data storage region as the read address and write address of the service information of the corresponding service and deleting all the picture information for the corresponding service.

In step S206, the control unit 114 adds the received video data to the data in the video data storage unit 106 and ends the process. The adding of the video data is carried out by, for example, writing the picture data in the data region for the corresponding service, additionally writing the picture information of the written picture data, and adding the written picture data length to the write address of the service information of the corresponding service.

In step S207, the control unit 114 checks the key picture reception flag in the video data storage unit 106: if the key picture reception flag is set, which means that the reception of a key picture has already been completed, the control unit 114 proceeds to step S208; if the key picture has not been received, in which case the key picture reception flag is cleared, the control unit 114 ends the process without adding the received video data to the video data storage unit 106.

In step S208, the control unit 114 adds the received video data to the data in the video data storage unit 106, thereby accumulating reference pictures other than key pictures, and ends the process.

In step S209, the control unit 114 checks the key picture reception flag in the video data storage unit 106: if the key picture reception flag is set (a key picture has been received), the control unit 114 proceeds to step S210; if the key picture reception flag is cleared (no key picture has been received), the control unit 114 ends the process.

In step S210, the control unit 114 decides which service the video data belong to. The control unit 114 proceeds to step S211 if the service to which the video data belong is the currently selected service, and ends the process if the service to which the video data belong is not the currently selected service.

In step S211, the control unit 114 adds the received video data to the data in the video data storage unit 106 and ends the process.

Figure 11:
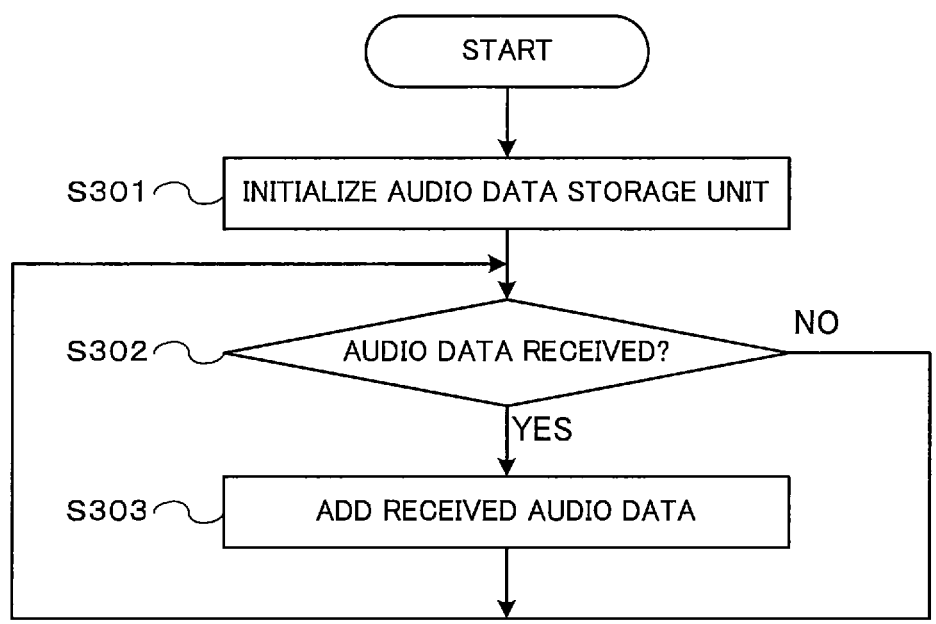
FIG. 11 is a flowchart showing an example of the audio data rewrite process shown in FIG. 7.

FIG. 11 is a flowchart showing an example of the audio data rewrite process in the digital broadcast receiver device 100 according to the first embodiment. The operation illustrated in FIG. 11 starts when the audio data rewrite process starts in step S24 shown in FIG. 7. The operation illustrated in FIG. 11 ends when the audio data rewrite process is halted in steps S15 and S29 shown in FIG. 7.

In step S301, the control unit 114 initializes the audio data storage unit 109 and proceeds to step S302. In the process of initializing the audio data storage unit 109, the first address of the region storing the data is specified as the read address and write address of the service information. In the process of initializing the audio data storage unit 109, all audio frame information is deleted.

In step S302, the control unit 114 checks whether audio data have been received from the demultiplexer unit 102 or descrambling unit 104. The control unit 114 proceeds to step S303 if audio data have been received, and to step S302 if audio data have not been received.

In step S303, the control unit 114 adds the received audio data to the data in the audio data storage unit 109 and proceeds to step S302. The process of adding the audio data is carried out by writing the audio frame data, additionally writing the frame information of the written audio frame data, and adding the data length of the written audio frame to the write address of the service information.

Figure 12:
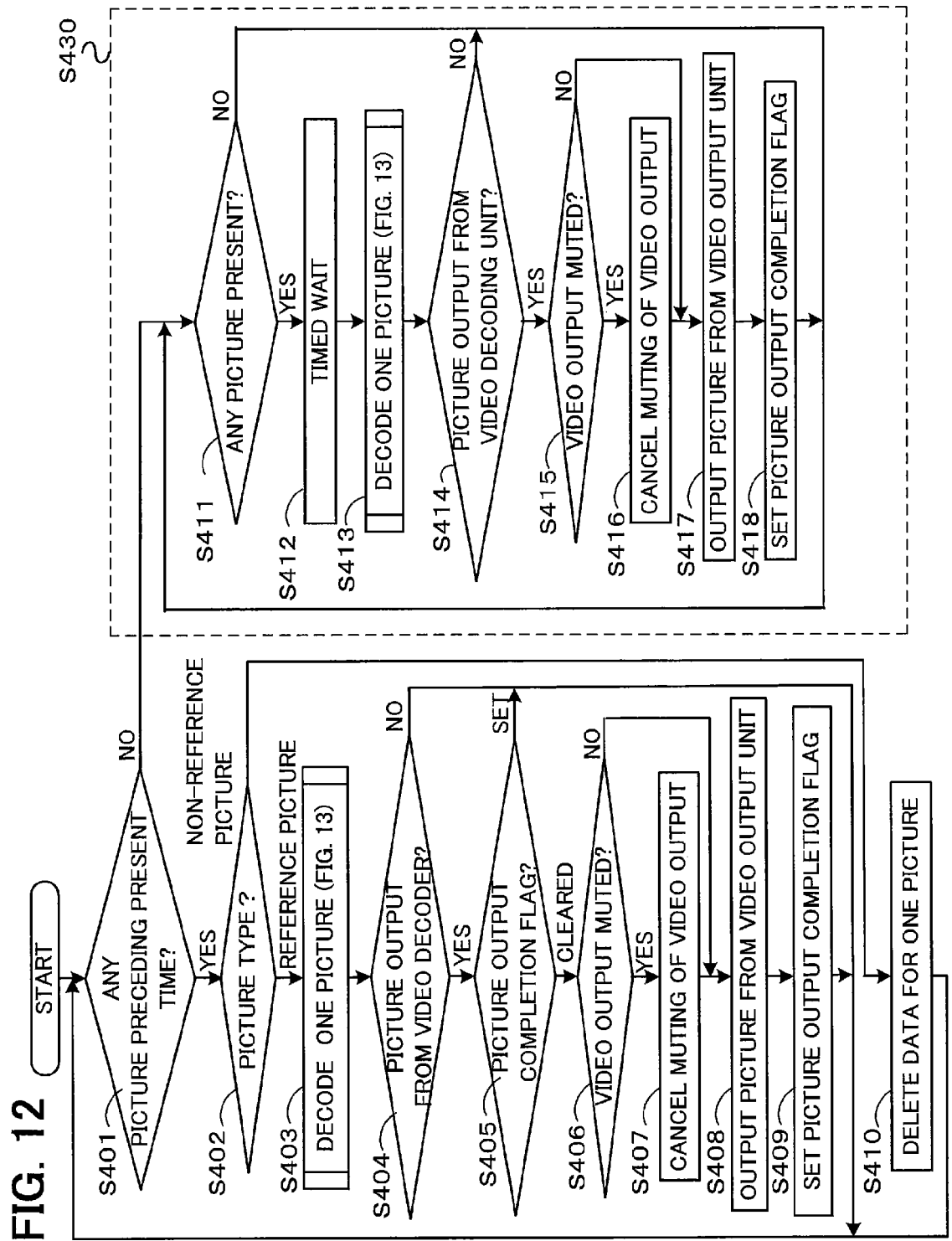
FIG. 12 is a flowchart showing an example of the video decoding process shown in FIG. 7.

FIG. 12 is a flowchart showing an example of the video decoding process in the digital broadcast receiver device 100 according to the first embodiment. The operation illustrated in FIG. 12 starts when the video decoding process starts in step S27 shown in FIG. 7. The operation illustrated in FIG. 12 ends when the video decoding process is halted by execution of step S53 shown in FIG. 8. In the video decoding process, while a picture having a decode time stamp preceding (earlier than) the time information in the time management unit 112 is present in the video data storage unit 106, reference pictures are decoded. Of the decoded pictures, just the key picture, which was decoded first, is displayed; the remaining reference pictures, which are not key pictures, are not displayed. After the decoding of pictures having a decode time stamp preceding (earlier than) the time information in the time management unit 112 finishes, each picture is decoded at the timing at which the time information in the time management unit 112 agrees with the decode time stamp of the picture, and the decoded picture is output.

In step S401, the control unit 114 checks whether the video data stored in the video data storage unit 106 include data having a decode time stamp preceding (earlier than) the current time in the time management unit 112. If data with a time preceding the time in the time management unit 112 are present, the control unit 114 proceeds to step S402; if data with a time preceding the time in the time management unit 112 are not present, the control unit 114 proceeds to step S411.

In step S402, the control unit 114 checks the picture type. If the picture is a reference picture, the control unit 114 proceeds to step S403; if the picture is a non-reference picture, the control unit 114 proceeds to step S410.

In step S403, the control unit 114 has the video decoding unit 107 execute the process of decoding a one-picture portion of the video data and proceeds to step S404. Details of the process of decoding a one-picture portion of the video data will be described later with reference to the flowchart in FIG. 13.

In step S404, the control unit 114 checks whether the video decoding unit 107 has output a picture as a result of the decoding in step S403. If a picture has been output from the video decoding unit 107, the control unit 114 proceeds to step S405; if no picture has been output, the control unit 114 proceeds to step S401.

In step S405, the control unit 114 checks the picture output completion flag in the video data storage unit 106. If the picture output completion flag is cleared, the control unit 114 proceeds to step S406; if the picture output completion flag is set, the control unit 114 proceeds to step S401. The picture output completion flag here is cleared when video decoding starts, and is set when one or more decoded pictures are output.

In step S406, the control unit 114 checks whether the video output from the video output unit 108 is muted. If the video output from the video output unit 108 is muted, the control unit 114 proceeds to step S407; if the video output from the video output unit 108 is not muted, the control unit 114 proceeds to step S408.

In step S407, the control unit 114 cancels the muting of the video output from the audio output unit 111 and proceeds to step S408.

In step S408, the control unit 114 has the video output unit 108 output pictures output from the video decoding unit 107 and proceeds to step S409.

In step S409, the control unit 114 sets the picture output completion flag in the video data storage unit 106 and proceeds to step S401.

In step S410, the control unit 114 deletes a one-picture portion of the video data and proceeds to step S401. The process of deleting a one-picture portion of the video data is carried out by, for example, deleting the picture information of the corresponding picture and adding the data length of the picture to the read address in the service information.

In step S411, the control unit 114 checks whether a picture is present in the video data stored in the video data storage unit 106. The control unit 114 proceeds to step S412 if a picture is present, and returns to step S411 if no picture is present.

In step S412, the control unit 114 waits for a period of time equal to the difference between the time in the time management unit 112 and the decode time stamp of the picture and then proceeds to step S413.

In step S413, the control unit 114 has the video decoding unit 107 execute the process of decoding a one-picture portion of the video data and proceeds to step S414. Details of the process of decoding a one-picture portion of the video data will be described later with reference to the flowchart in FIG. 13.

In step S414, the control unit 114 checks whether the video decoding unit 107 has output a picture as a result of the decoding in step S413. The control unit 114 proceeds to step S415 if the video decoding unit 107 has output a picture, and to step S411 if no picture has been output.

In step S415, the control unit 114 checks whether the video output from the video output unit 108 is muted. The control unit 114 proceeds to step S416 if the video output from the video output unit 108 is muted, and to step S417 if the video output from the video output unit 108 is not muted.

In step S416, the control unit 114 cancels the muting of the video output from the video output unit 108 and proceeds to step S417.

In step S417, the control unit 114 has the video output unit 108 output the picture output from the video decoding unit 107 and proceeds to step S418.

In step S418, the control unit 114 sets the picture output completion flag in the video data storage unit 106 and proceeds to step S411. The processing in steps S411 to S418 in FIG. 12 will also be referred to as step S430.

Figure 13:
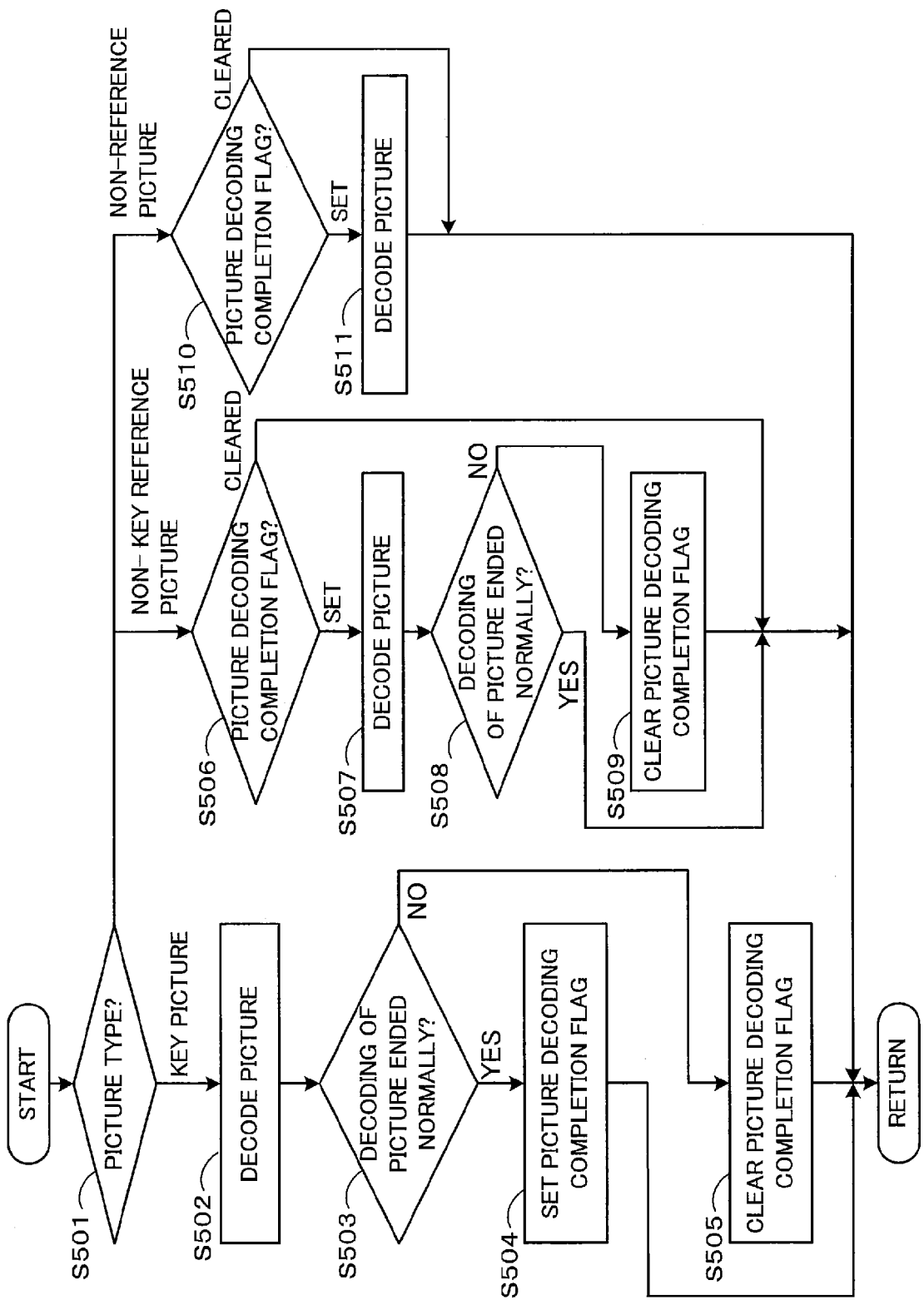
FIG. 13 is a flowchart showing an example of the process of decoding a one-picture video portion in the digital broadcast receiver devices according to the first to fourth embodiments.

FIG. 13 is a flowchart showing an example of the process of decoding a one-picture portion of the video data in the digital broadcast receiver device 100 according to the first embodiment. In the process of decoding a one-picture portion of the video data, key pictures are decoded first; non-reference pictures and reference pictures other than key pictures are not decoded until a key picture has been decoded. If a data error occurs owing to a weak electric field (weak electrical strength of the received broadcast signal) and decoding of a reference picture does not end normally, non-reference pictures and reference pictures other than key pictures are not decoded until another key picture has been decoded. The operation illustrated in FIG. 13 starts when the process of decoding a one-picture portion of the video data shown in steps S403 and S413 in FIG. 12 is executed.

As shown in FIG. 13, the control unit 114 checks the picture type in step S501. The control unit 114 proceeds to step S502 if the picture is a key picture, to step S506 if the picture is a reference picture other than a key picture, and to step S510 if the picture is a non-reference picture.

In step S502, the control unit 114 has the video decoding unit 107 decode the picture and proceeds to step S503. After the decoding finishes, the control unit 114 deletes the decoded picture from the video data storage unit 106. Data are deleted by, for example, deleting the picture information of the corresponding picture.

In step S503, the control unit 114 checks whether the decoding in step S502 has ended normally. The control unit 114 proceeds to step S504 if the decoding has ended normally, and to step S505 if the decoding has not ended normally.

In step S504, the control unit 114 sets the picture decoding completion flag in the video data storage unit 106 and ends the process.

In step S505, the control unit 114 clears the picture decoding completion flag in the video data storage unit 106 and ends the process.

In step S506, the control unit 114 checks the picture decoding completion flag in the video data storage unit 106. If the picture decoding completion flag is set, the control unit 114 proceeds to step S507; if the picture decoding completion flag is cleared, the control unit 114 ends the process.

In step S507, the control unit 114 has the video decoding unit 107 decode the picture and proceeds to step S508.

In step S508, the control unit 114 checks whether the decoding in step S507 has ended normally. If the decoding has ended normally, the control unit 114 ends the process; if the decoding has not ended normally, the control unit 114 proceeds to step S509.

In step S509, the control unit 114 clears the picture decoding completion flag in the video data storage unit 106 and ends the process.

In step S510, the control unit 114 checks the picture decoding completion flag in the video data storage unit 106. If the picture decoding completion flag is set, the control unit 114 proceeds to step S511; if the picture decoding completion flag is cleared, the control unit 114 ends the process.

In step S511, the control unit 114 has the video decoding unit 107 decode the picture and then ends the process.

Figure 14:
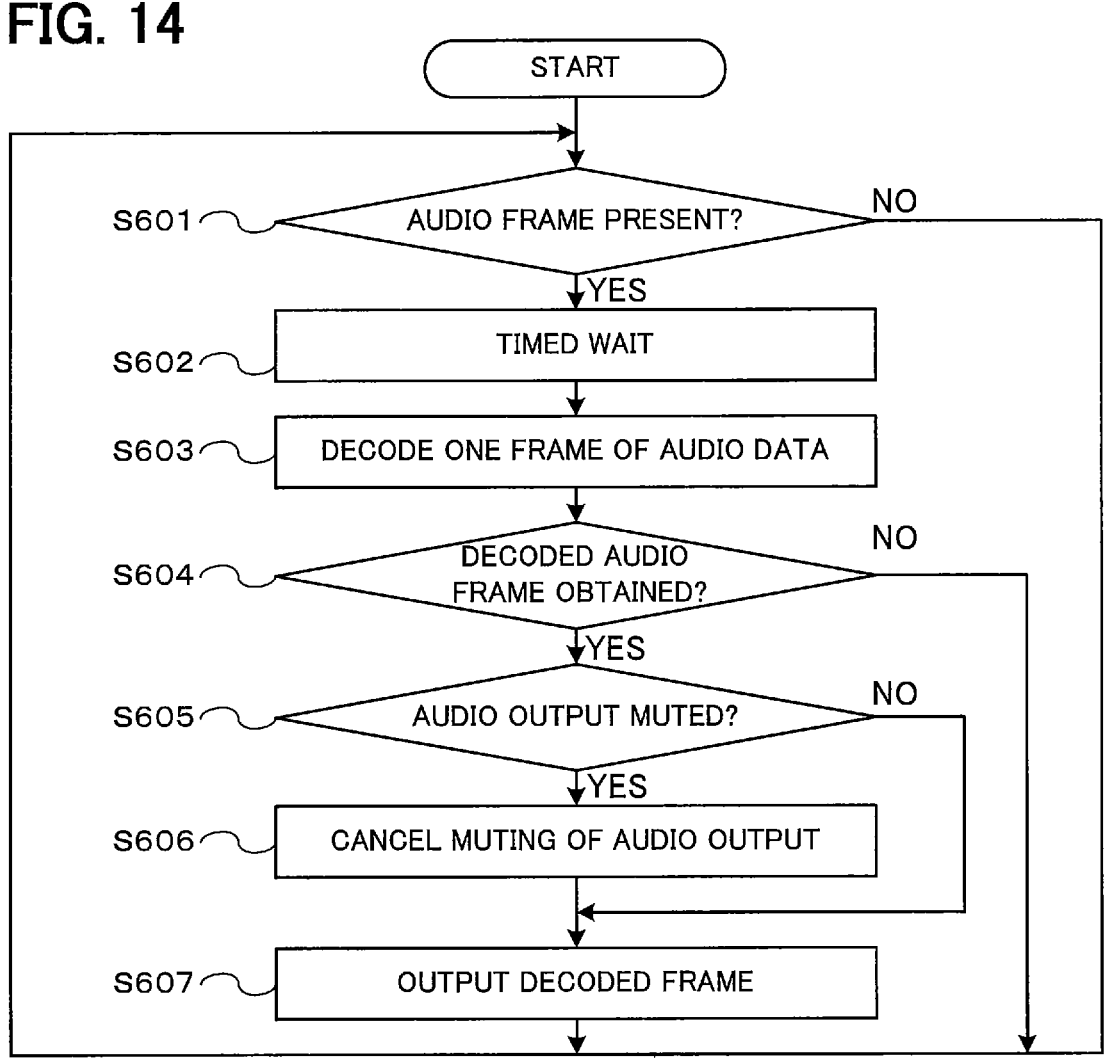
FIG. 14 is a flowchart showing an example of the audio decoding process in the digital broadcast receiver devices according to the first to fourth embodiments.

FIG. 14 is a flowchart showing an example of the audio decoding process in the digital broadcast receiver device 100 according to the first embodiment. The operation illustrated in FIG. 14 starts when the audio decoding process starts in step S26 shown in FIG. 7. The operation illustrated in FIG. 14 ends when the audio decoding process is halted by execution of step S54 shown in FIG. 8.

In step S601, the control unit 114 checks whether an audio frame is present in the audio data storage unit 109. If an audio frame is present, the control unit 114 proceeds to step S602; if no audio frame is present, the control unit 114 proceeds to step S601.

In step S602, the control unit 114 waits for a period of time equal to the difference between the time in the time management unit 112 and the decode time stamp of the frame and proceeds to step S603.

In step S603, the control unit 114 has the audio decoding unit 110 execute the process of decoding a one-frame portion of the audio data and proceeds to step S604. After the decoding finishes, the control unit 114 deletes the decoded audio frame from the audio data storage unit 109. The deletion of data is carried out by, for example, deleting the audio frame information of the corresponding audio frame and adding the data length of the audio frame to the read address in the service information.

In step S604, the control unit 114 checks whether a decoded audio frame has been obtained as a result of the decoding in step S603. The control unit 114 proceeds to step S605 if a decoded audio frame has been obtained, and to step S601 if a decoded audio frame has not been obtained.

In step S605, the control unit 114 checks whether the audio output from the audio output unit 111 is muted. The control unit 114 proceeds to step S606 if the audio output from the audio output unit 111 is muted, and to step S607 if the audio output from the audio output unit 111 is not muted.

In step S606, the control unit 114 cancels the muting of the audio output from the audio output unit 111 and proceeds to step S607.

In step S607, the control unit 114 has the audio output unit 111 output the decoded audio frame and proceeds to step S601.

Figure 15:
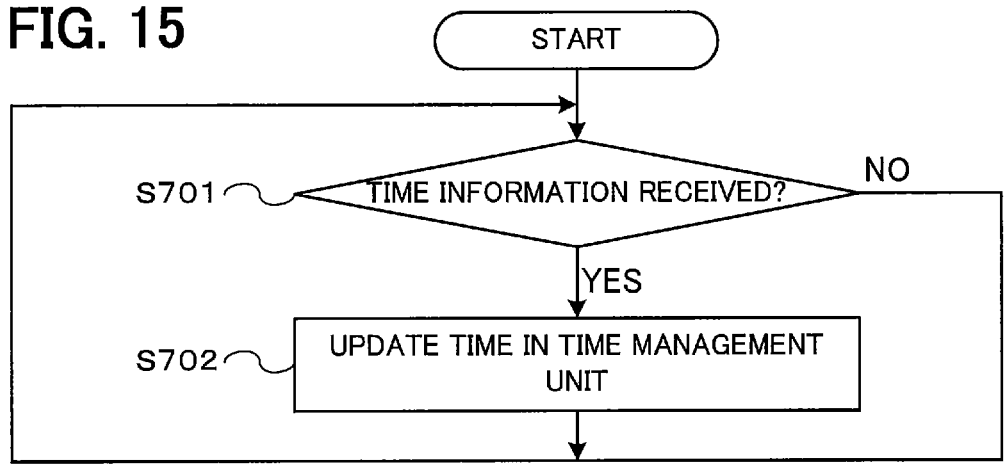
FIG. 15 is a flowchart showing an example of the time information update process in the digital broadcast receiver devices according to the first to fourth embodiments.

FIG. 15 is a flowchart showing an example of the time information update process in the digital broadcast receiver device 100 according to the first embodiment. The operation illustrated in FIG. 15 starts when the time information update process starts in steps S23 and S33 shown in FIG. 7. The operation illustrated in FIG. 15 ends when the time information update process is halted in steps S17 and S31 shown in FIG. 7.

In step S701, the control unit 114 checks whether time information has been received from the demultiplexer unit 102. The control unit 114 proceeds to step S702 if time information has been received, and to step S701 if no time information has been received.

In step S702, the control unit 114 updates the time information in the time management unit 112 and proceeds to step S701.

Figure 16:
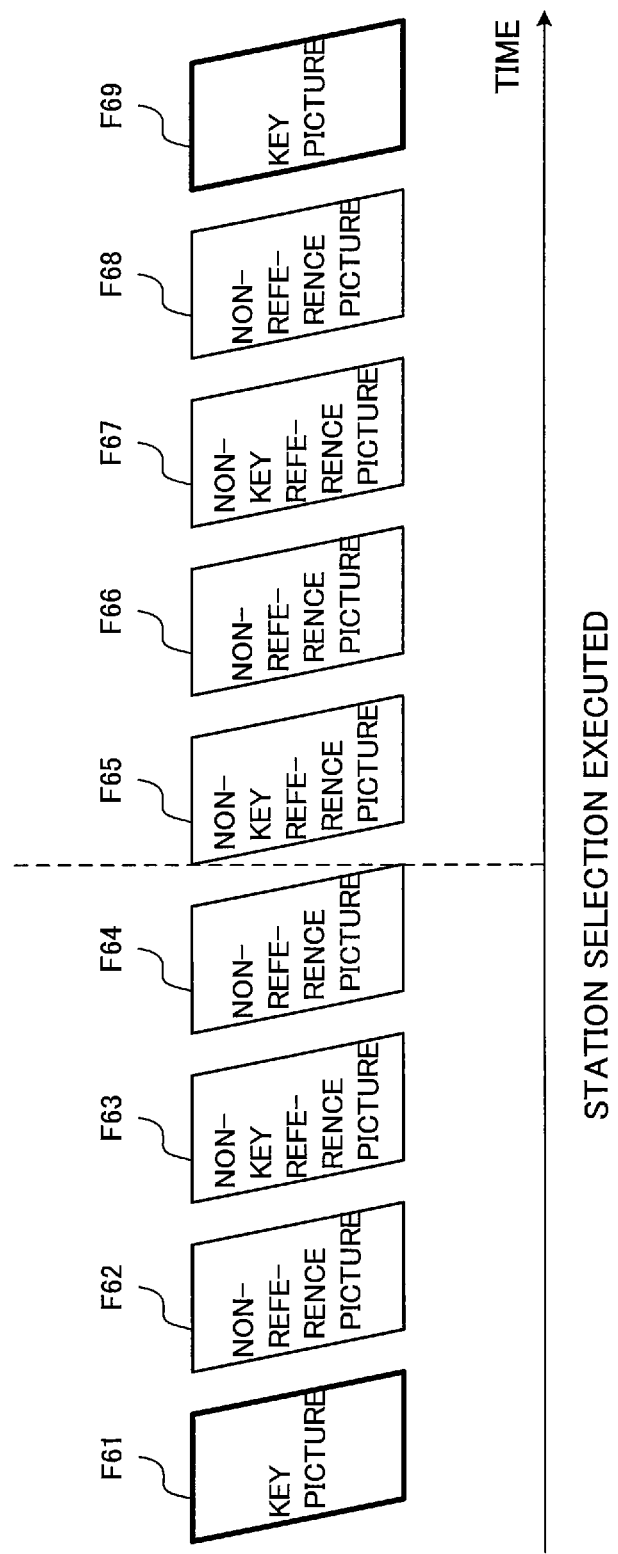
FIG. 16 is a diagram illustrating the difference between video picture decoding at the time of station selection in a comparative example of a receiver device and the digital broadcast receiver device according to the first embodiment.

The difference in video picture decoding at the time of station selection between the receiver described in patent reference 1 and the digital broadcast receiver device 100 according to the first embodiment will be described with reference to FIG. 16. In FIG. 16, pictures F61 to F64 represent pictures transmitted before a new service is selected, and pictures F65 to F69 represent pictures transmitted after service selection. Pictures F61 to F69 represent key pictures; pictures F62, F64, F66, and F68 represent non-reference pictures; pictures F63, F65, and F67 represent reference pictures other than key pictures.

Before the service is selected, of pictures F61, F62, F63, F64 in FIG. 16, the receiver described in patent reference 1 stores only the key picture F61. When pictures F65, F66, F67, and F68 are received after the service is selected, they cannot be decoded, so the video of key picture F61 has to be displayed until key picture F69 is received. Accordingly, starting from when video display begins after service selection, the receiver in patent reference 1 continues to display a still picture for a period of time equal, in the maximum case, to the key picture transmission periodicity, and cannot display a moving picture during that period.

Of pictures F61 to F64 in FIG. 16, the digital broadcast receiver device 100 according to the first embodiment stores key picture F61 and picture F63, which is a reference picture other than a key picture, before service selection. Consequently, the digital broadcast receiver device 100 according to the first embodiment can decode the video data of pictures F65 to F69, which are received after the service is selected. In comparison with the receiver in patent reference 1, the digital broadcast receiver device 100 according to the first embodiment can shorten the time needed until display of a moving picture can begin after a still picture is displayed following a service selection; in the maximum case, the time is shortened by an amount equal to the key picture transmission periodicity.

Second Embodiment

The digital broadcast receiver device 200 according to a second embodiment differs from the digital broadcast receiver device 100 according to the first embodiment in the control (of the operation of other components) performed by the control unit 214. Specifically, the digital broadcast receiver device 200 according to the second embodiment differs from the digital broadcast receiver device 100 according to the first embodiment in regard to the video decoding process. Otherwise, the digital broadcast receiver device 200 according to the second embodiment is the same as the digital broadcast receiver device 100 according to the first embodiment. The drawings used in the description of the first embodiment will also be used in the description of the digital broadcast receiver device 200 according to the second embodiment.

The digital broadcast receiver device 100 according to the first embodiment continues to display the still image of the key picture decoded first until decoding of pictures having a decode time stamp preceding the time information in the time management unit 112 is completed. Therefore, if many reference pictures other than key pictures having decode time stamps preceding the time information in the time management unit 112 are stored, it may take time to finish the decoding of those pictures, preventing a moving picture from being displayed immediately.

The digital broadcast receiver device 200 according to the second embodiment displays a moving picture even before the decoding of pictures having decode time stamps preceding the time information in the time management unit 112 is completed and can shorten the time needed until display of a moving picture can begin after a still picture is displayed following the selection of a new service.

Figure 17:
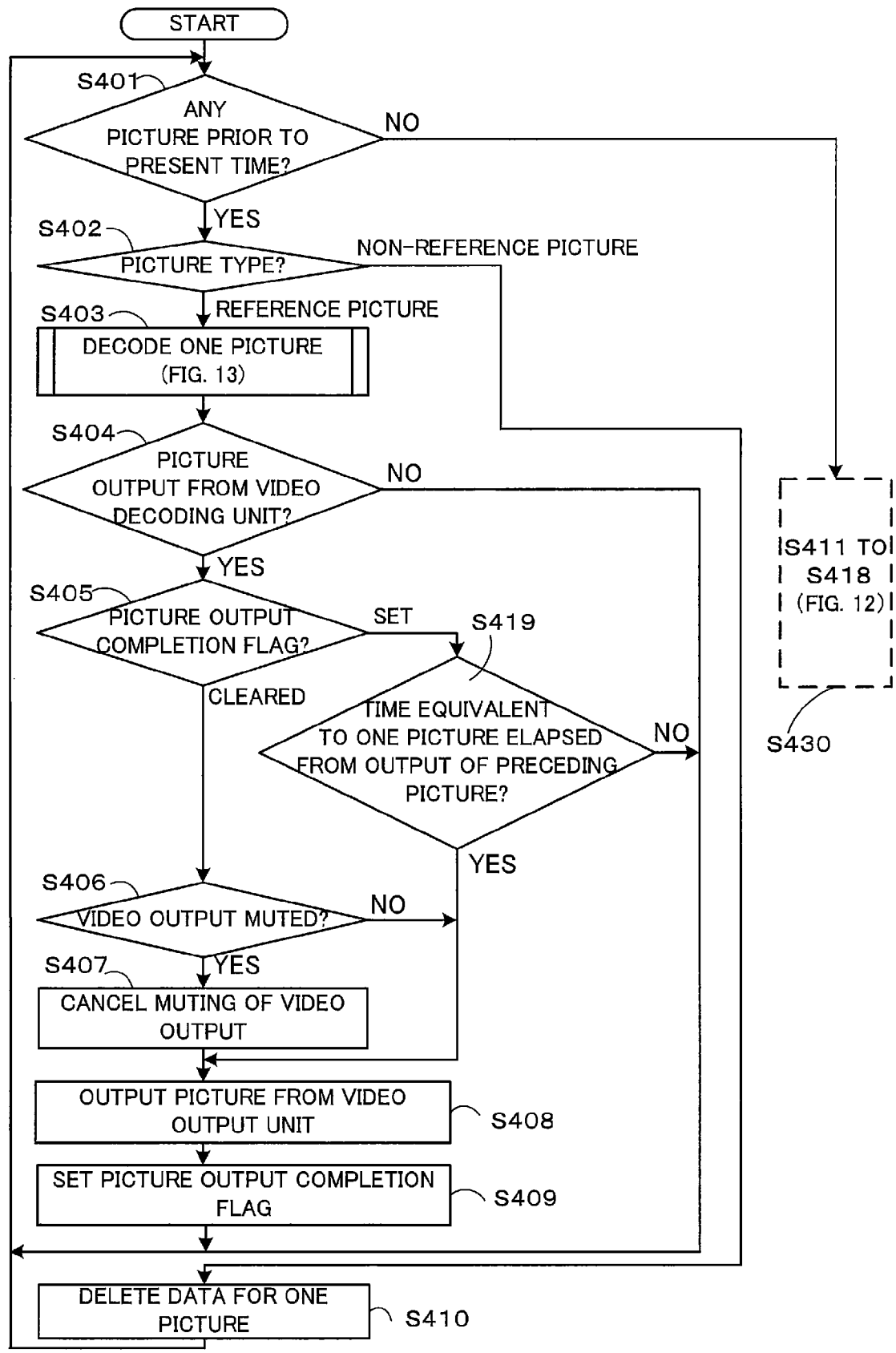
FIG. 17 is a flowchart showing an example of the video decoding process in a digital broadcast receiver device according to the second embodiment.

FIG. 17 is a flowchart showing an example of the video decoding process in the digital broadcast receiver device 200 according to the second embodiment. In FIG. 17, steps identical to or corresponding to steps in FIG. 12 (first embodiment) are indicated by like reference characters. The video decoding process in the digital broadcast receiver device 200 according to the second embodiment differs from the video decoding process in the digital broadcast receiver device 100 according to the first embodiment in that step S419 is added.

As shown in FIG. 17, the control unit 214 in the second embodiment checks the picture output completion flag in the video data storage unit 106 in step S405. The control unit 214 proceeds to step S407 if the picture output completion flag is cleared, and to step S419 if the picture output completion flag is set.

In step S419, the control unit 214 checks whether the time corresponding to one picture (the length of the sampling cycle) has elapsed from the output of the preceding picture. The control unit 214 proceeds to step S408 if the time corresponding to one picture has elapsed from the preceding picture output, and to step S401 if the time corresponding to one picture has not elapsed from the preceding picture output.

The digital broadcast receiver device 100 according to the first embodiment continues to display the image of the key picture decoded first until the decoding of pictures having decode time stamps preceding the time information in the time management unit 112 is completed.

Because of step S419, while pictures having decode time stamps preceding the time information in the time management unit 112 are being decoded, the digital broadcast receiver device 200 according to the second embodiment changes the output picture at intervals of time corresponding to one picture from the preceding picture output. Accordingly, a moving picture can be displayed while pictures having a decode time stamp preceding the time information in the time management unit 112 are being decoded. Therefore, in comparison with the digital broadcast receiver device 100 according to the first embodiment, the digital broadcast receiver device 200 according to the second embodiment can shorten the time needed until display of a moving picture can begin after a still image is displayed following service selection; in the maximum case, the time is shortened by a time equal to the time needed to decode the reference pictures other than key pictures that are inserted between two key pictures.

Third Embodiment

The digital broadcast receiver device 300 according to a third embodiment differs from the digital broadcast receiver device 200 according to the second embodiment in the control (of the operation of other components) performed by the control unit 314. Specifically, the digital broadcast receiver device 300 according to the third embodiment differs from the digital broadcast receiver device 300 according to the second embodiment in regard to the video decoding process. Otherwise, the digital broadcast receiver device 300 according to the third embodiment is the same as the digital broadcast receiver device 200 according to the second embodiment. The drawings used in the description of the first and second embodiments will also be used in the description of the digital broadcast receiver device 300 according to the third embodiment.

In the digital broadcast receiver device 200 according to the second embodiment, even after a key picture is received following station selection, decoding of the pictures having decode time stamps preceding the time information in the time management unit 112 continues as long as any such pictures remain undecoded. Therefore, while the decoding of pictures having decode time stamps preceding the time information is continuing, a moving picture that lags the moving picture that should be displayed at that time may be displayed instead.

In the digital broadcast receiver device 300 according to the third embodiment, when a key picture is received after a station selection, even if pictures having decode time stamps preceding the time information in the time management unit 112 remain undecoded, the key picture received after the station selection is decoded instead of the remaining pictures, to prevent the display of a moving picture that lags the picture that should be displayed at that time.

Figure 18:
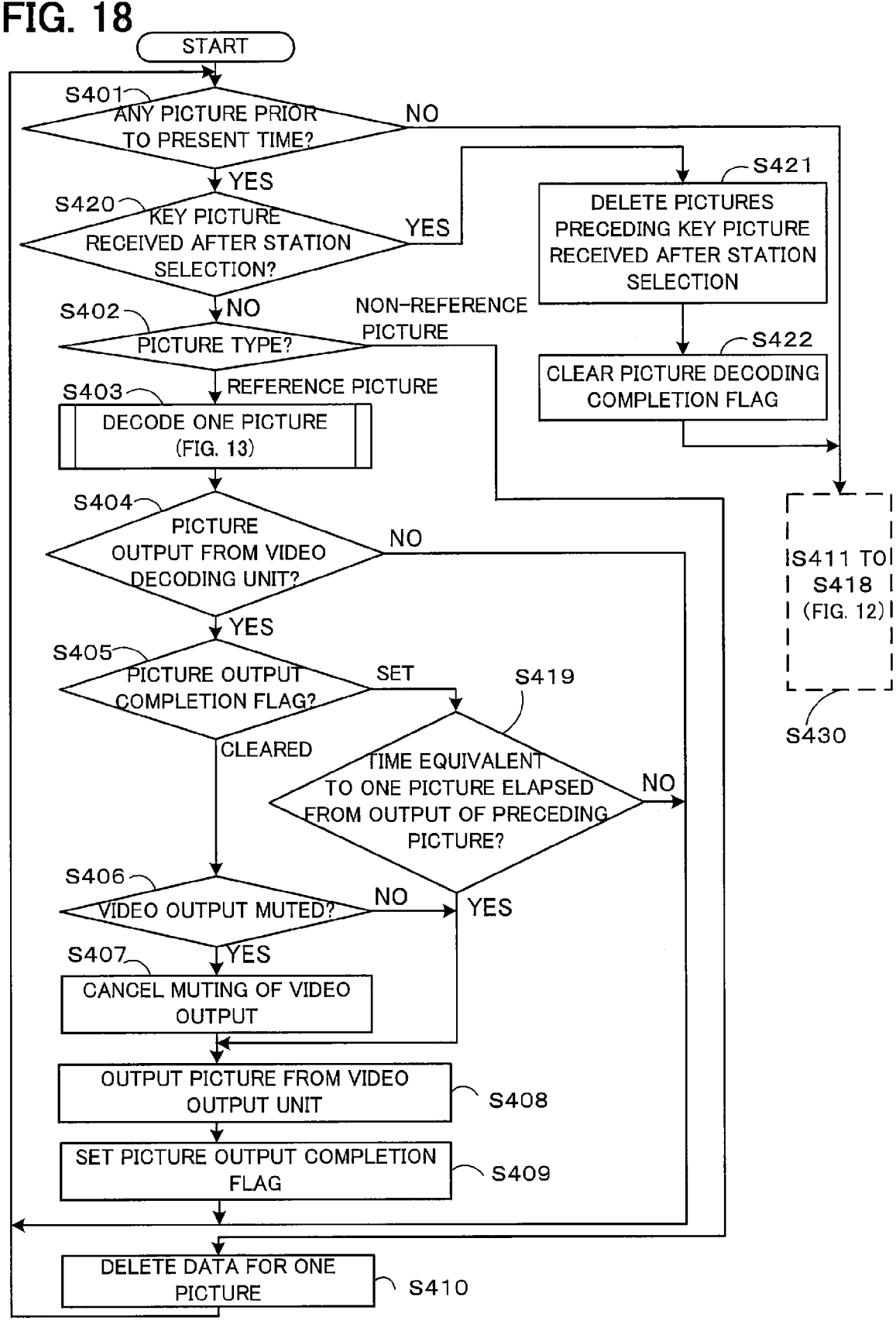
FIG. 18 is a flowchart showing an example of the video decoding process in a digital broadcast receiver device according to the third embodiment.

FIG. 18 is a flowchart showing an example of the video decoding process in the digital broadcast receiver device 300 according to the third embodiment. In FIG. 18, steps identical to or corresponding to steps in FIG. 17 are indicated by like reference characters. The video decoding process in the digital broadcast receiver device 300 according to the third embodiment differs from the video decoding process in the digital broadcast receiver device 200 according to the second embodiment in that steps S420 to S422 are added.

As shown in FIG. 18, the control unit 314 checks in step S401 whether the video data stored in the video data storage unit 106 include data having a decode time stamp preceding the current time in the time management unit 112. If data preceding the time in the time management unit 112 are present, the control unit 314 advances to step S420; if data preceding the time in the time management unit 112 are not present, the control unit 314 advances to step S411 (step S430).

In step S420, the control unit 314 checks whether a key picture has been received after station selection. If a key picture has been received after station selection, the control unit 314 proceeds to step S421; if no key picture has been received after station selection, the control unit 314 proceeds to step S402.

In step S421, the control unit 314 deletes, from the video data storage unit 106, all data having an earlier decode time stamp than the key picture received after the station selection and proceeds to step S422.

In step S422, the control unit 314 clears the picture decoding completion flag in the video data storage unit 106 and proceeds to step S411 (step S430).

In the digital broadcast receiver device 200 according to the second embodiment, when a key picture is received after a new service is selected by the user, if pictures having decode time stamps preceding the time information in the time management unit 112 remain undecoded, decoding of the pictures having decode time stamps preceding the time information continues. Therefore, while decoding of the pictures having decode time stamps preceding the time information is continuing, the displayed video may lag the video that should be displayed at that time.

In the digital broadcast receiver device 300 according to the third embodiment, however, when a key picture is received after a selection is made, even if pictures having decode time stamps preceding the time information in the time management unit 112 remain undecoded, the key picture received after the service selection can be decoded because of steps S420 to S422, without decoding the remaining pictures. Therefore, the digital broadcast receiver device 300 according to the third embodiment can eliminate the occurrence of a period of time, immediately after a new service is selected, during which the moving picture that is displayed lags the moving picture that should be displayed at that time.

Fourth Embodiment

The digital broadcast receiver device 400 according to a fourth embodiment differs from the digital broadcast receiver devices according to the first, second, and third embodiments in the control (of the operation of other components) performed by the control unit 414 and in the information stored in the video data storage unit 406. Specifically, the digital broadcast receiver device 400 according to the fourth embodiment differs from the digital broadcast receiver devices according to the first, second, and third embodiments in regard to the operating procedure in the video data receiving process. Otherwise, the digital broadcast receiver device 400 according to the fourth embodiment is the same as the digital broadcast receiver devices according to the first, second, and third embodiments. The drawings used in the descriptions of the first, second, and third embodiments will also be used in the description of the digital broadcast receiver device 400 according to the fourth embodiment.

Figure 19:
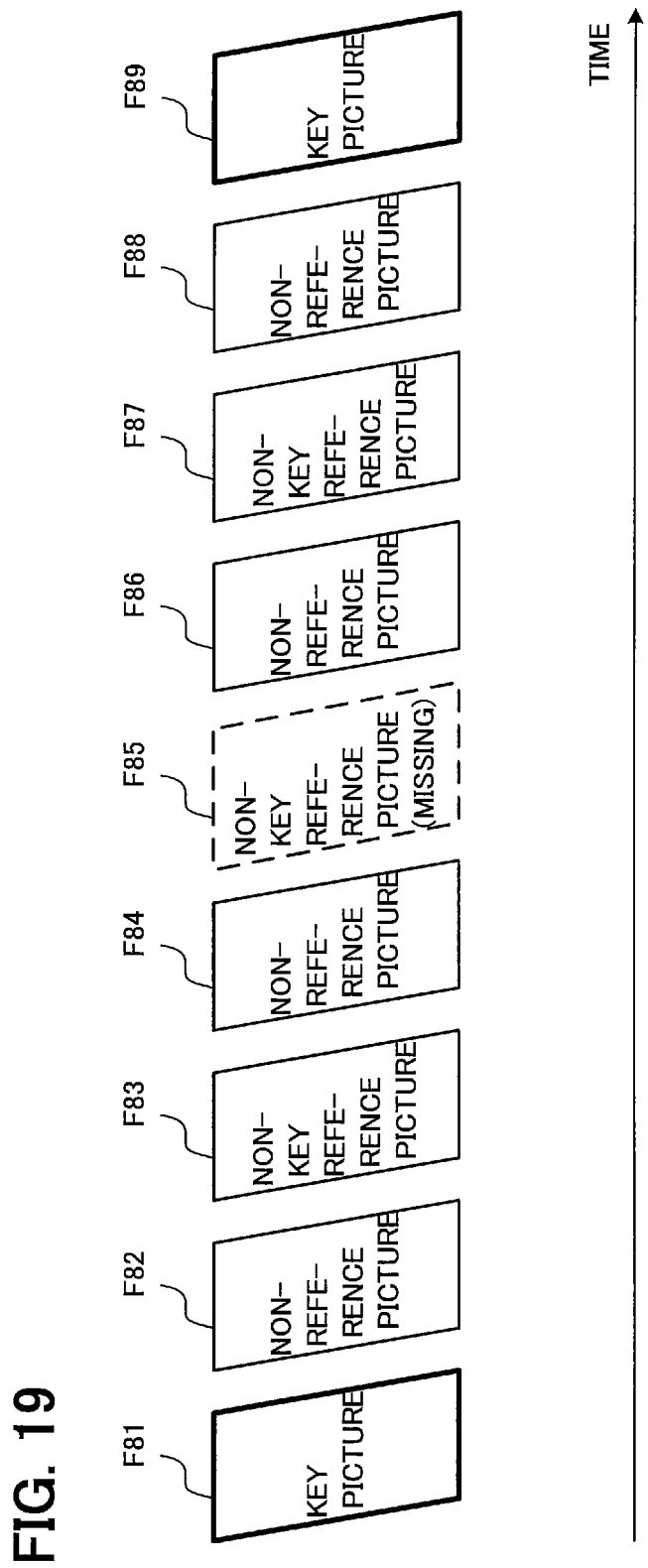
FIG. 19 is a diagram illustrating video disruption due to a missing picture in a digital broadcast receiver device according to the fourth embodiment.

In the digital broadcast receiver device 300 according to the third embodiment, even if a video picture is missing owing to a weak electric field (weak electrical strength of the received broadcast signal), decoding is performed despite the missing picture, and disrupted video may be displayed. This problem of the digital broadcast receiver device 300 according to the third embodiment will be described with reference to FIG. 19. In FIG. 19, pictures F81 and F89 represent key pictures; pictures F82, F84, F86, and F88 represent non-reference pictures; pictures F83, F85, and F87 represent reference pictures other than key pictures. F85 is a picture (missing picture) that could not be received by the digital broadcast receiver device 300 because of a weak electric field. In FIG. 19, when decoding non-reference picture F86, non-key reference picture F87, and non-reference picture F88, the video decoding unit 107 has to refer to non-key reference picture F85. When non-reference picture F86, non-key reference picture F87, and non-reference picture F88 are decoded while non-key reference picture F85 is missing, decoding is performed with reference to a picture differing from the picture that should be referred to, and disrupted video may consequently be displayed.

In the digital broadcast receiver device 400 according to the fourth embodiment, when a reference picture is received, the control unit 414 calculates the differences between the decode time stamp of the reference picture and other reference pictures received before it and has the video data storage unit 406 store the minimum value. When a picture is received, the control unit 414 calculates the difference between the decode time stamp of the received picture and, among pictures other than non-reference pictures, the decode time stamp of the past picture closest to the received picture. If the calculated difference is greater than the stored minimum value of the decode time stamp differences, the control unit 414 decides that a picture other than a forward or backward picture is missing, and begins all over again from the reception of a key picture. This type of control can prevent decoding from being performed with reference to a picture differing from the picture that should be referred to.

Figure 20:
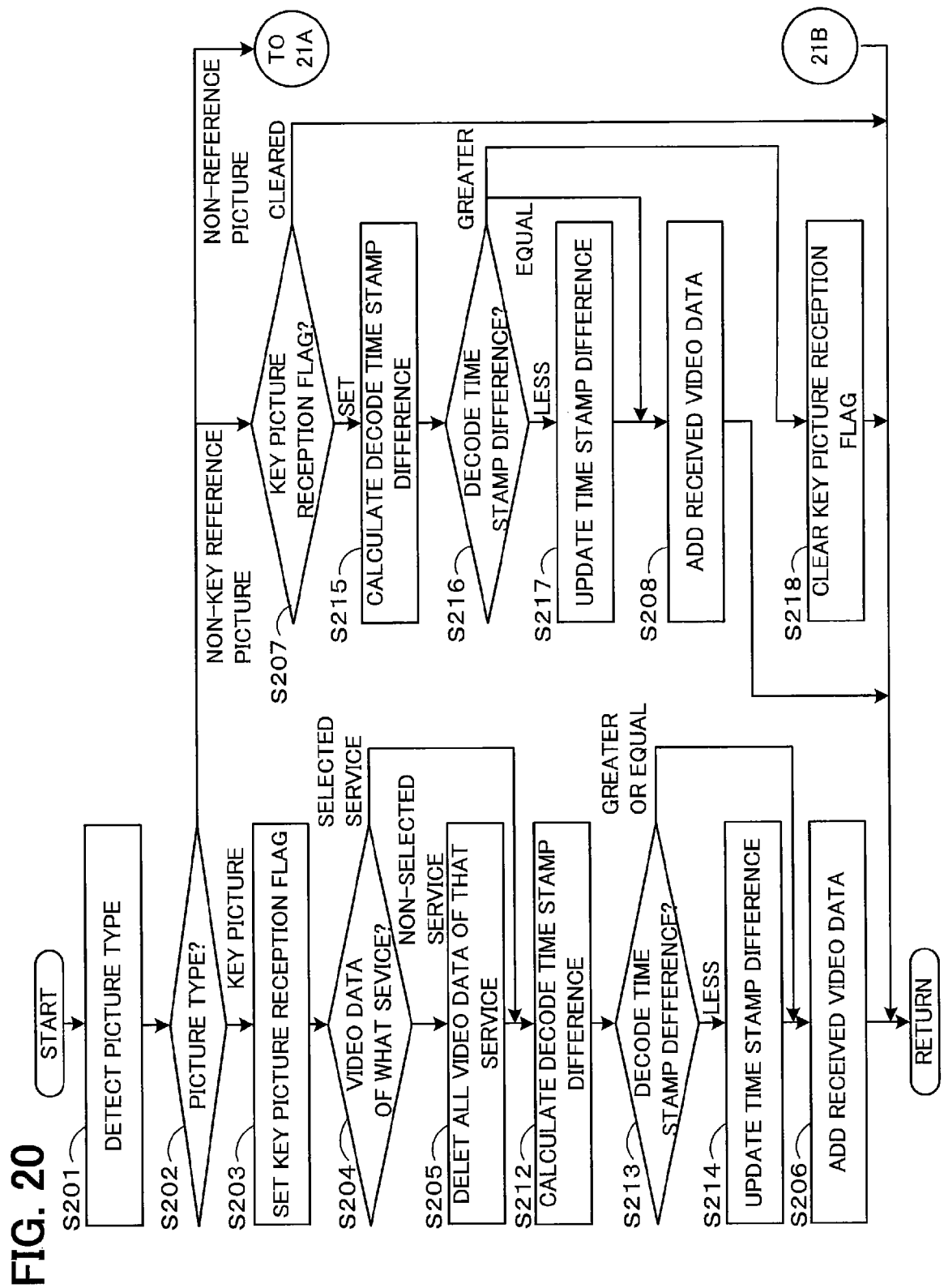
FIG. 20 is a flowchart (part 1) showing an example of the video data receiving process in the digital broadcast receiver device according to the fourth embodiment.
Figure 21:
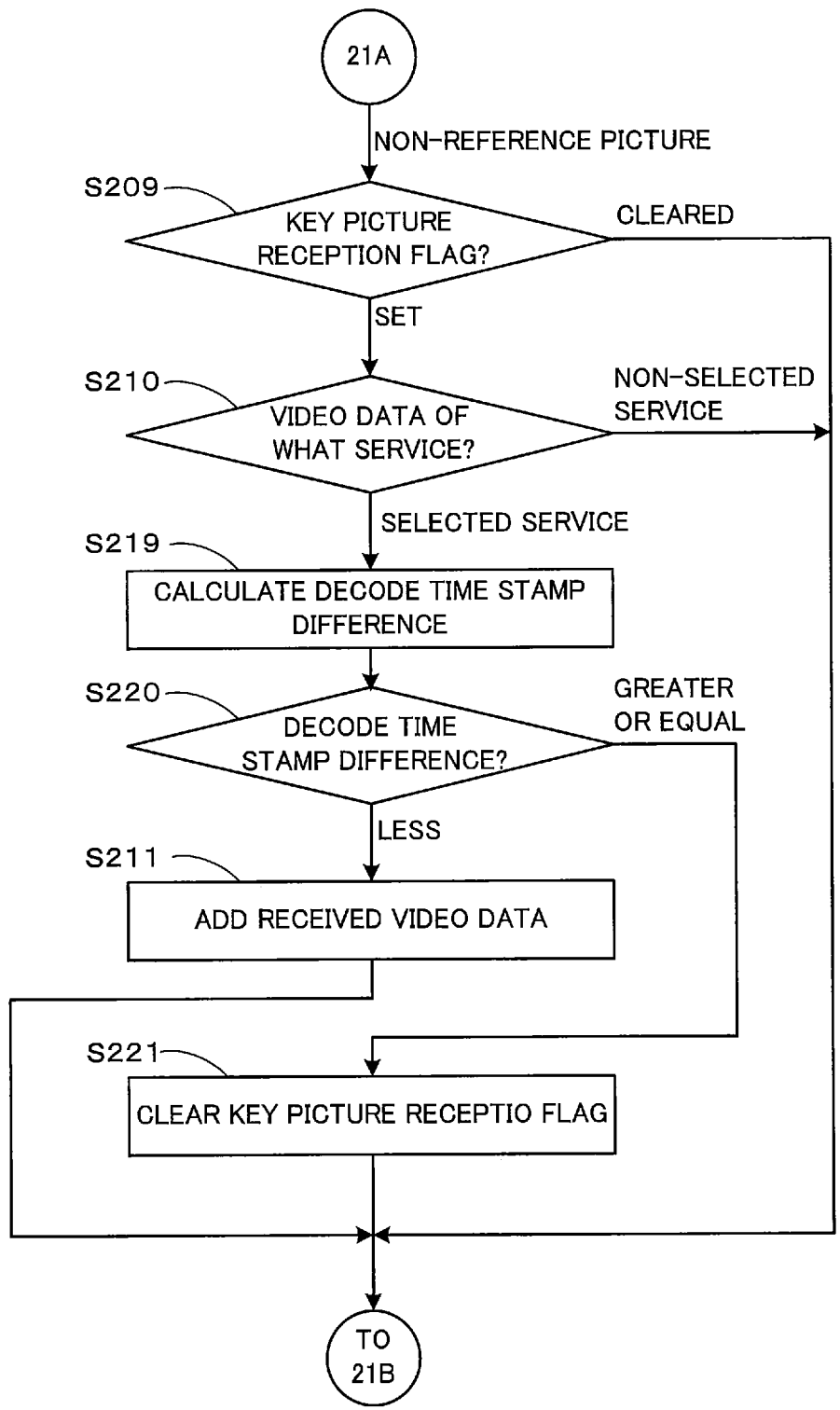
FIG. 21 is a flowchart (part 2) showing an example of the video data receiving process in the digital broadcast receiver device according to the fourth embodiment.

FIGS. 20 and 21 are flowcharts showing an example of the video data receiving process in the digital broadcast receiver device 400 according to the fourth embodiment. In FIGS. 20 and 21, steps identical to or corresponding to steps in FIG. 10 are indicated by like reference characters. The video data receiving process in the digital broadcast receiver device 400 according to the fourth embodiment differs from the video data receiving process (FIG. 10) in the digital broadcast receiver devices according to the first, second, and third embodiments in that steps S212 to S214, steps S215 to S217, and steps S218, S219, S220, and S221 are added.

In step S204 (FIG. 20), the control unit 414 determines which service the video data belong to. If the service to which the video data belong is not the currently selected service, the control unit 414 proceeds to step S205; if the service to which the video data belong is the currently selected service, the control unit 114 proceeds to step S212.

In step S205 (FIG. 20), the control unit 414 deletes from the video data storage unit 406 all the video data stored for the same service as the service to which the received video data belong and proceeds to step S212.

In step S212 (FIG. 20), the control unit 414 calculates the difference between the decode time stamp of the received picture and the decode time stamp of the past picture closest to the received picture among pictures other than non-reference pictures and proceeds to step S213.

In step S213 (FIG. 20), the control unit 414 compares the decode time stamp difference calculated in step S212 with the decode time stamp difference stored in the video data storage unit 406. If the decode time stamp difference calculated in step S212 is less than the decode time stamp difference stored in the video data storage unit 406, the control unit 414 proceeds to step S214; if the calculated decode time stamp difference is greater than or equal to the decode time stamp difference stored in the video data storage unit 406, the control unit 414 proceeds to step S206.

In step S214 (FIG. 20), the control unit 414 updates the decode time stamp difference stored in the video data storage unit 406 to the decode time stamp difference calculated in step S212 and proceeds to step S206.

In step S206 (FIG. 20), the control unit 414 adds the received video data to the data in the video data storage unit 406 and ends the process.

In step S207 (FIG. 20), the control unit 414 checks the key picture reception flag in the video data storage unit 406, proceeds to step S215 if the key picture reception flag is set, and ends the process if the key picture reception flag is cleared.

In step S215 (FIG. 20), the control unit 414 calculates the difference between the decode time stamp of the received picture and the decode time stamp of the past picture closest to the received picture, among pictures other than non-reference pictures, and proceeds to step S216.

In step S216 (FIG. 20), the control unit 414 compares the decode time stamp difference calculated in step S215 and the decode time stamp difference recorded in the video data storage unit 406. If the decode time stamp difference calculated in step S216 is less than the decode time stamp difference stored in the video data storage unit 406, the control unit 414 proceeds to step S217; if the differences are the same, the control unit 414 proceeds to step S208; if the difference calculated in step S216 is greater, the control unit 414 proceeds to step S218.

In step S217 (FIG. 20), the control unit 414 updates the decode time stamp difference recorded in the video data storage unit 406 to the decode time stamp difference calculated in step S215 and proceeds to step S208.

In step S208 (FIG. 20), the control unit 414 adds the received video data to the data in the video data storage unit 406 and ends the process.

In step S218 (FIG. 20), the control unit 414 clears the key picture reception flag in the video data storage unit 406 and ends the process.

In step S209 (FIG. 21), the control unit 414 checks the key picture reception flag in the video data storage unit 406, proceeds to step S210 if the key picture reception flag is set, and ends the process if the key picture reception flag is cleared.

In step S210 (FIG. 21), the control unit 414 determines which service the video data belong to. The control unit 414 proceeds to step S219 if the service to which the video data belong is the currently selected service, and ends the process if the service to which the video data belong is not the currently selected service.

In step S219 (FIG. 21), the control unit 414 calculates the difference between the decode time stamp of the received picture and the decode time stamp of the past picture closest to the received picture, among pictures other than non-reference pictures, and proceeds to step S220.

In step S220 (FIG. 21), the control unit 414 compares the decode time stamp difference calculated in step S219 with the decode time stamp difference recorded in the video data storage unit 406. The control unit 414 proceeds to step S211 if the decode time stamp difference calculated in step S219 is less than the decode time stamp difference recorded in the video data storage unit 406, and proceeds to step S221 if the calculated difference in decode time stamp is greater than or equal to the decode time stamp difference recorded in the video data storage unit 406.

In step S211 (FIG. 21), the control unit 414 adds the received video data to the data in the video data storage unit 406 and ends the process.

In step S221 (FIG. 21), the control unit 414 clears the key picture reception flag in the video data storage unit 406 and ends the process.

In the digital broadcast receiver device 300 according to the third embodiment, even if a video picture is missing owing to a weak electric field, decoding is performed despite the missing picture, and disrupted video may be displayed.

In the digital broadcast receiver device 400 according to the fourth embodiment, the minimum value of the difference in decode time stamp values between pictures other than non-reference pictures is stored in the video data storage unit 406 through the process in steps S212, S213, and S214 and the process in steps S215, S216, and S217. The difference between the decode time stamp of the received picture and the decode time stamp of the past picture closest to the received picture is calculated. If the decode time stamp difference is greater than the minimum value of the decode time stamp difference stored in the video data storage unit 406, the processing proceeds to steps S218 and S221 to return to the state in which no key picture has been received and the processing begins all over again from the reception of a key picture. Accordingly, in comparison with the digital broadcast receiver devices according to the first, second, and third embodiments, the digital broadcast receiver device 400 according to the fourth embodiment can reduce the possibility of a disrupted video display.

Fifth Embodiment

Figure 22:
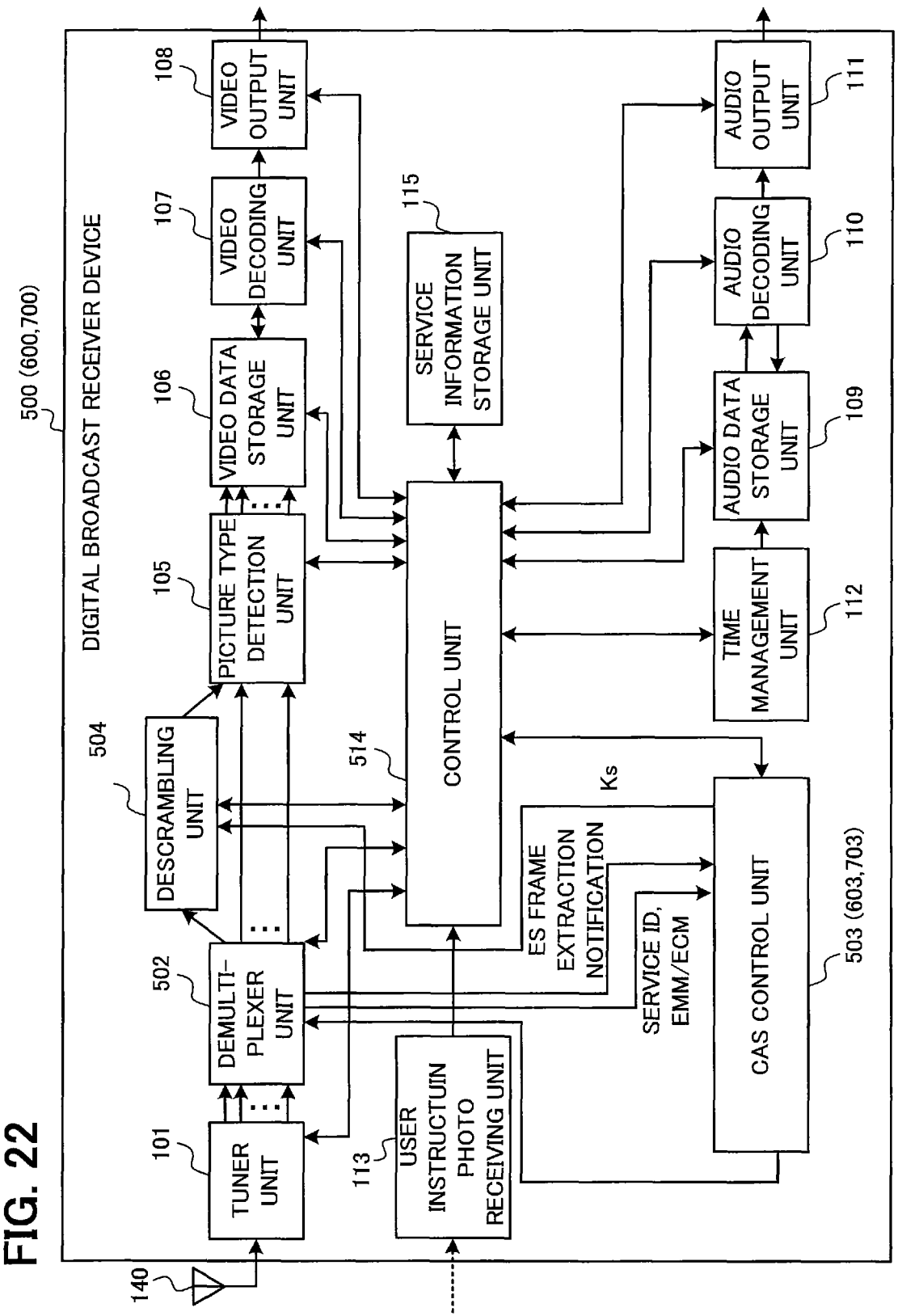
FIG. 22 is a block diagram schematically showing an example of the configuration of a digital broadcast receiver device according to fifth to seventh embodiments of the invention.

FIG. 22 is a block diagram schematically showing an example of the configuration of the digital broadcast receiver device 500 according to a fifth embodiment. The reference characters in parentheses in FIG. 22 apply to sixth and seventh embodiments.

The digital broadcast receiver device 500 according to the fifth embodiment differs from the digital broadcast receiver devices according to the first, second, third, and fourth embodiments in regard to processes in the demultiplexer unit 502, CAS control unit 503, descrambling unit 504, and control unit 514. Specifically, in the digital broadcast receiver device 500 according to the fifth embodiment, the descrambling process is performed for the currently selected service and other services, and the video data are then recorded in the video data storage unit 106. When the digital broadcast receiver devices according to the first, second, third, and fourth embodiments receive scrambled services, they descramble only the stream of the service to be viewed. Accordingly, a long time is needed until audio and video are output in the digital broadcast receiver devices according to the first, second, third, and fourth embodiments, because the descrambling key generation process and audio and video descrambling processes are not executed until the user gives a station selection instruction. In the digital broadcast receiver device 500 according to the fifth embodiment, all the service streams stored in the video data storage unit 106 are descrambled streams.

The descrambling unit 504 therefore descrambles a plurality of services to be stored in the video data storage unit 106. Usually a descrambling core such that even a single descrambling core has a processing capability considerably exceeding the stream rate per service is used. That type of descrambling core is used here to descramble the streams of services by time division.

Figure 23:
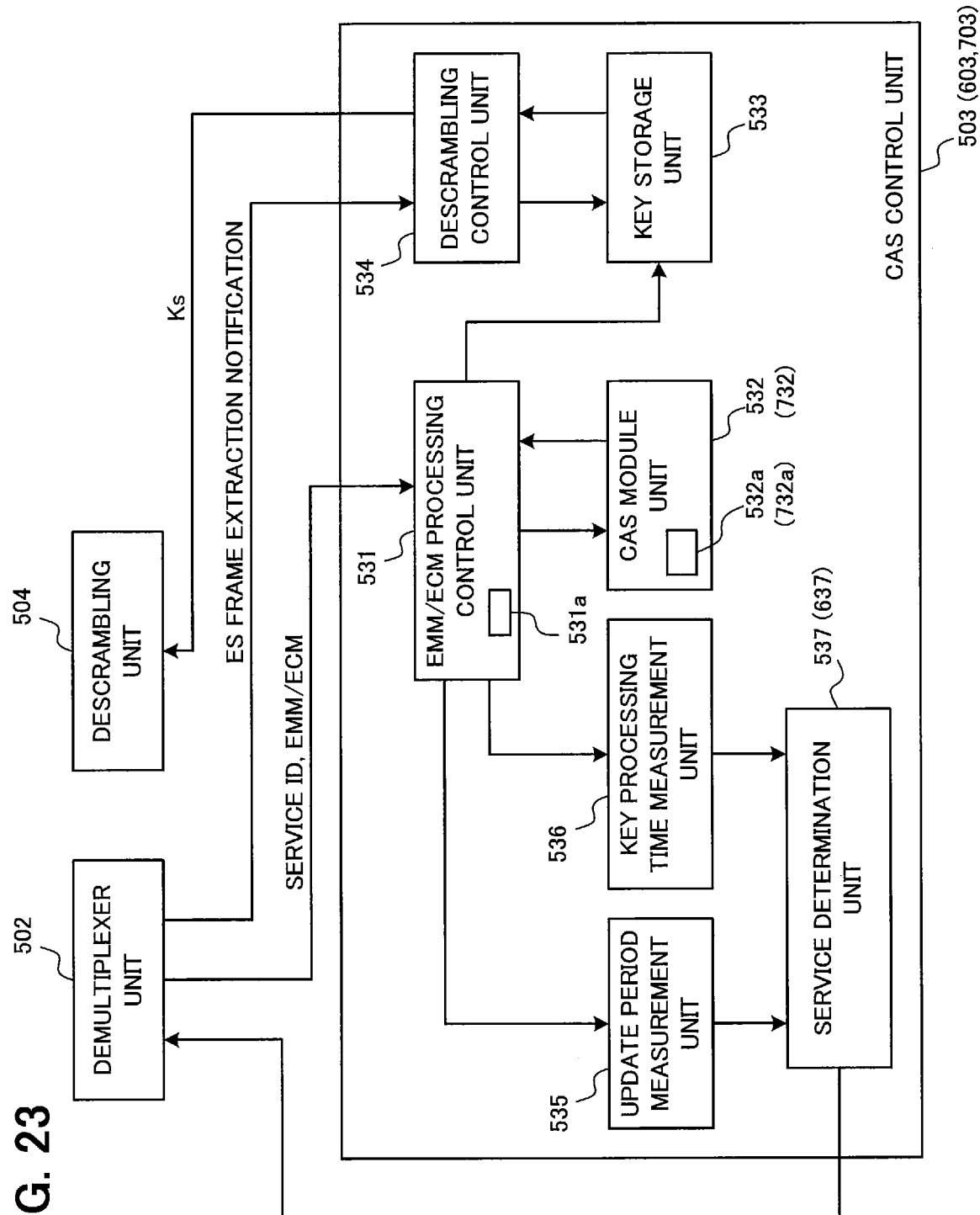
FIG. 23 is a block diagram schematically showing an example of the configuration of the CAS control unit in the fifth embodiment.

FIG. 23 is a block diagram schematically showing an example of the configuration of the CAS control unit 503 in the fifth embodiment. The CAS control unit 503 includes an EMM/ECM processing control unit 531, a CAS module 532, a key storage unit 533, a descrambling control unit 534, an update period measurement unit 535, a key processing time measurement unit 536, and a service determination unit 537. The reference characters in parentheses in FIG. 23 apply to the sixth and seventh embodiments.

The EMM/ECM processing control unit 531 analyzes the EMM extracted by the demultiplexer unit 502 and transfers necessary information required to generate a Km to the CAS module 532. The CAS module 532 uses the necessary information received from the EMM/ECM processing control unit 531 to generate a Km and stores the Km in its internal memory 532a. When the demultiplexer unit 502 extracts an ECM, the demultiplexer unit 502 transfers a service ID and the ECM to the EMM/ECM processing control unit 531. The EMM/ECM processing control unit 531 analyzes the ECM and transfers necessary information needed to generate a Ks to the CAS module 532. The CAS module 532 uses the necessary information received from the EMM/ECM processing control unit 531 and the Km to generate a Ks and supplies the generated Ks to the EMM/ECM processing control unit 531. The EMM/ECM processing control unit 531 gives the Ks and a corresponding service ID to the key storage unit 533. The key storage unit 533 stores the Ks in association with the corresponding service ID in descrambling key management information 533a as shown in FIG. 24. The descrambling key management information 533a includes the service ID and the Ks for descrambling the stream of the service identified by the service ID.

Here the EMM and ECM will be described. The stream is scrambled by the sender by using the Ks, and the Ks is encrypted by using the Km, as described earlier. To descramble a stream, first the Km must be generated from information stored in the EMM, and then the encrypted Ks stored in the ECM must be decrypted by using the Km. The Ks is updated at relatively short time intervals; the Km is updated at longer intervals than the Ks. The Ks varies according to the service or ES; the Km generally varies according to the CAS provider subscribed to.

To store as much descrambled video data as possible in the video data storage unit 106, the CAS module 532 has to generate Ks's for a plurality of services quickly. Accordingly, the demultiplexer unit 502 extracts EMMs and ECMs for a plurality of services, and the CAS module 532 performs the Km generation process and the Ks generation process by time division.

When one frame of an elementary stream (ES) is extracted, the demultiplexer unit 502 gives the descrambling control unit 534 an ES frame extraction notification including a service ID corresponding to the ES. When it receives this notification, the descrambling control unit 534 obtains a corresponding Ks from the key storage unit 533 by using the service ID included in the notification as a search key. The descrambling control unit 534 sets the obtained Ks in the descrambling unit 504. The descrambling unit 504 uses the set Ks to descramble a single frame of the ES extracted by the demultiplexer unit 502.

The CAS module 532 processes the Ks's of different services by time division to allow descrambling of a plurality of services. The condition that must be satisfied for correct decoding of the stream of a service and correct video display is that the time needed to generate the Ks of the service must be shorter than the ECM update period of the service. When the Ks's of a plurality of services are generated by time division, the sum of the Ks generation times of all the services to be processed must be less than the ECM update period of each service to be processed. Further, when the EMM is updated, the condition that must be satisfied is as follows: the total sum of the sum of the Km generation times of all services to be processed and the sum of the Ks generation times of all services to be processed must be smaller than the ECM update period of each service to be processed. The service determination unit 537 selects services to be descrambled such that this condition is satisfied and such that as many services as possible can be descrambled.

The ECM update period may not be specified in some broadcast standards and may vary with country, region, and service. The update period measurement unit 535 continuously monitors the ECM update period reported from the demultiplexer unit 502 to the EMM/ECM processing control unit 531 and measures the update period in each service, so that the ECM update period determined by a given broadcast standard, country, region, or service can be adapted to automatically.

The Ks generation time in the CAS module 532 depends on the performance of the CAS module used. The Ks generation time also depends on the broadcast standard, country, region, and service because the ECM configuration varies therewith. To enable compatibility with a given CAS module, broadcast standard, country, region, and service to be maintained automatically, the key processing time measurement unit 536 continuously monitors the Ks generation time from when the necessary information extracted from the ECM is input from the EMM/ECM processing control unit 531 to the CAS module 532 until when the CAS module 532 outputs the generated Ks to the EMM/ECM processing control unit 531 and measures the Ks generation time of each service.

From the ECM update period of each service measured by the update period measurement unit 535 and the Ks generation time of each service measured by the key processing time measurement unit 536, the service determination unit 537 determines which services to descramble. When the service determination unit 537 determines the services to be descrambled, the control unit 514 controls the tuner unit 101 to receive the services to be descrambled and sets up the demultiplexer unit 502 for audio/video ES, ECM, EMM, and PSI/SI information (program information) extraction.

Figure 25:
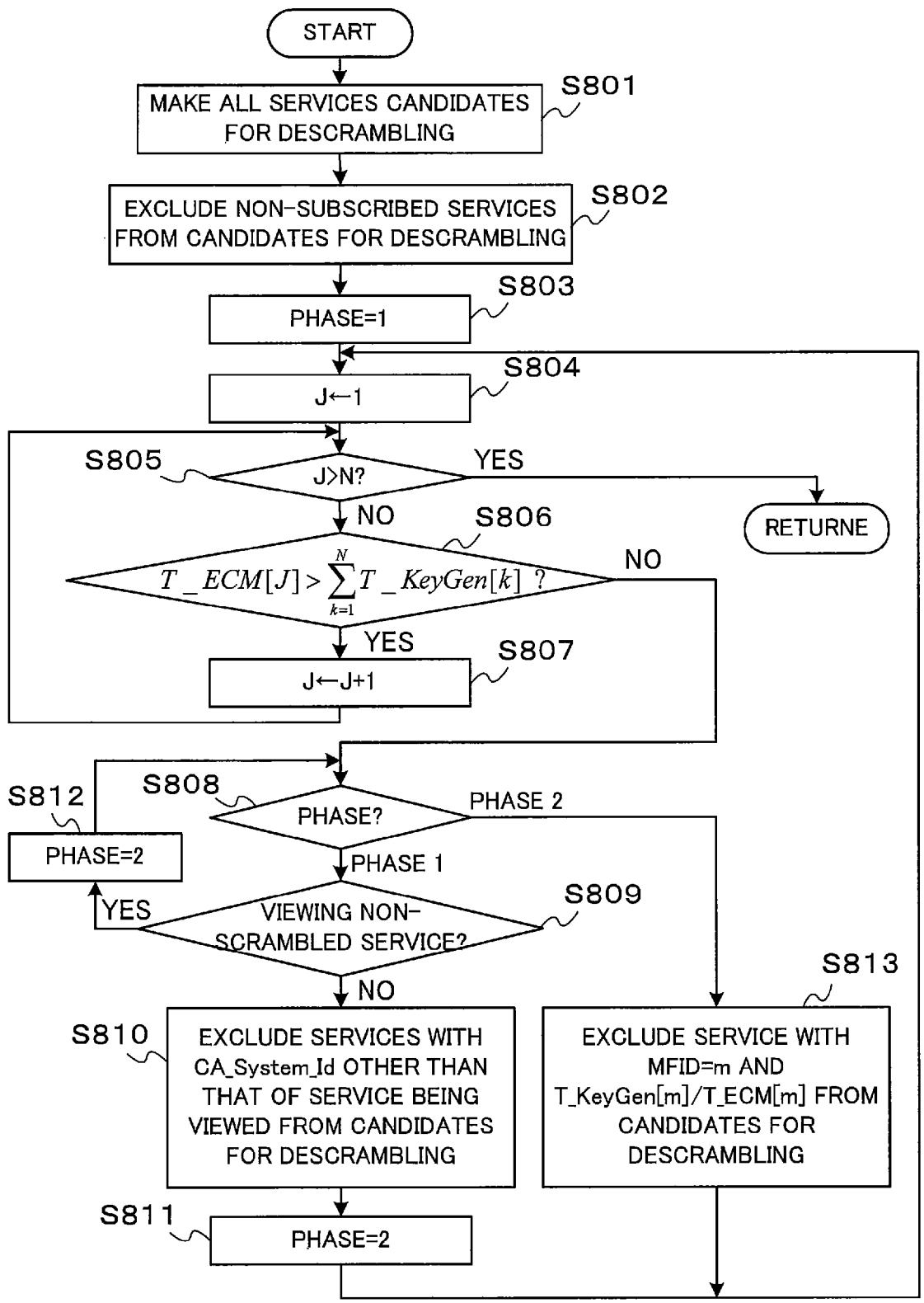
FIG. 25 is a flowchart showing an example of the process of determining which services to descramble in the service determination unit in the fifth embodiment.

FIG. 25 is a flowchart showing an example of the process of determining which services to descramble in the service determination unit 537 in the fifth embodiment.

In step S801, the service determination unit 537 treats all the services received simultaneously as candidate services for descrambling and proceeds to step S802.

In step S802, the service determination unit 537 excludes non-subscribed services from the candidate services for descrambling and proceeds to step S803. To see whether a service has been subscribed to, the EMM/ECM processing control unit 531 can, for example, supply the CAS module 532 with the necessary information extracted from the ECM and check its response. The EMM/ECM processing control unit 531 makes these inquiries to the CAS module 532 beforehand, generates subscription information indicating subscribed services, and stores the subscription information in a memory 531a in the EMM/ECM processing control unit 531. The service determination unit 537 obtains the subscription information from the EMM/ECM processing control unit 531 and excludes non-subscribed services from the candidate services for descrambling.

In step S803, the service determination unit 537 initializes a phase variable to '1' and proceeds to step S804. The phase variable determines the operating mode in which the services to be excluded from the candidate services for descrambling are derived. When the phase variable is '1', the service determination unit 537 excludes from the descrambling candidate services those services having a CA_System_Id value that differs from the CA_System_Id value of the currently selected service. When the phase variable is '2', the service determination unit 537 excludes from the descrambling candidate services the service having the maximum ratio of Ks generation time to ECM update period: in other words, those services that require a relatively long time to generate a Ks.

In step S804, the service determination unit 537 initializes an index J for identifying services to '1' and proceeds to step S805. The services received by the digital broadcast receiver device 500 are assigned sequential natural numbers from '1' to 'N' as indices.

In step S805, the service determination unit 537 checks whether the index J exceeds the maximum value 'N'. The service determination unit 537 ends the process if the index J exceeds 'N', and proceeds to step S806 if the index J does not exceed 'N'.

In step S806, the service determination unit 537 checks whether the ECM update period (T_ECM[J]) of the service identified by index J is longer than the sum of the Ks generation times (KeyGen[1]+KeyGen[2]+ . . . +KeyGen[k]+ . . . +KeyGen[N]) of the services specified as candidates for descrambling. For example, if a service having an index J with the value 'k' is a non-scrambled service, the ECM update period of the service is infinite (T_ECM[k]=∞), and the Ks generation time for the service is '0' (T_KeyGen[k]= 0). The service determination unit 537 proceeds to step S807 if the ECM update period of the service is longer than the sum of the Ks generation times, and to step S808 if the ECM update period of the service is shorter than or equal to the sum of the Ks generation times.

In step S807, the service determination unit 537 adds '1' to the index J and proceeds to step S805.

In step S808, the service determination unit 537 checks the phase variable. The service determination unit 537 proceeds to step S809 if the phase variable is '1', and to step S813 if the phase variable is '2'.

In step S809, the service determination unit 537 determines whether the currently selected service is a non-scrambled service. Whether a service has been scrambled or not can be known, for example, from the SI information or from scramble information included in the header added to the audio or video content. The demultiplexer unit 502 gives the EMM/ECM processing control unit 531a service ID and scramble state information indicating whether the service identified by the service ID has been scrambled. The EMM/ECM processing control unit 531 stores the scramble state information in its internal memory 531a. The service determination unit 537 obtains the scramble information from the EMM/ECM processing control unit 531 to determine whether the currently selected service is a non-scrambled service. If the currently selected service is not a non-scrambled service, that is, if the currently selected service is a scrambled service, the service determination unit 537 proceeds to step S810; if the currently selected service is a non-scrambled service, the service determination unit 537 proceeds to step S812.

In step S810, the service determination unit 537 excludes services having CA_System_Id values differing from the CA_System_Id value of the currently selected service from the candidate services for descrambling and proceeds to step S811. The CA_System_Id value is included in the SI information, for example. The demultiplexer unit 502 supplies the EMM/ECM processing control unit 531 with a service ID and corresponding information indicating the CA_System_Id value of the service identified by the service ID. The EMM/ECM processing control unit 531 stores the correspondence information in its internal memory 531a. The service determination unit 537 obtains the correspondence information from the EMM/ECM processing control unit 531 to check the CA_System_Id value of each service.

In step S811, the service determination unit 537 sets the phase variable to '2' and proceeds to step S804.

In step S812, the service determination unit 537 sets the phase variable to '2' and proceeds to step S808.

In step S813, the service determination unit 537 excludes the service m that has the highest ratio of Ks generation time (T_KeyGen[m]) to the ECM update period (T_ECM[m]) from the candidate services for descrambling, and proceeds to step S804. This ratio is '0' for a non-scrambled service.

In step S806, the service determination unit 537 may check whether the ECM update period (T_ECM[J]) of the service identified by the index J is longer than the total of the sum of the Km generation times of the services and the sum of the Ks generation times (KeyGen[1]+KeyGen[2]+ . . . +KeyGen[k]+ . . . +KeyGen[N]) of the services.

Figure 26:
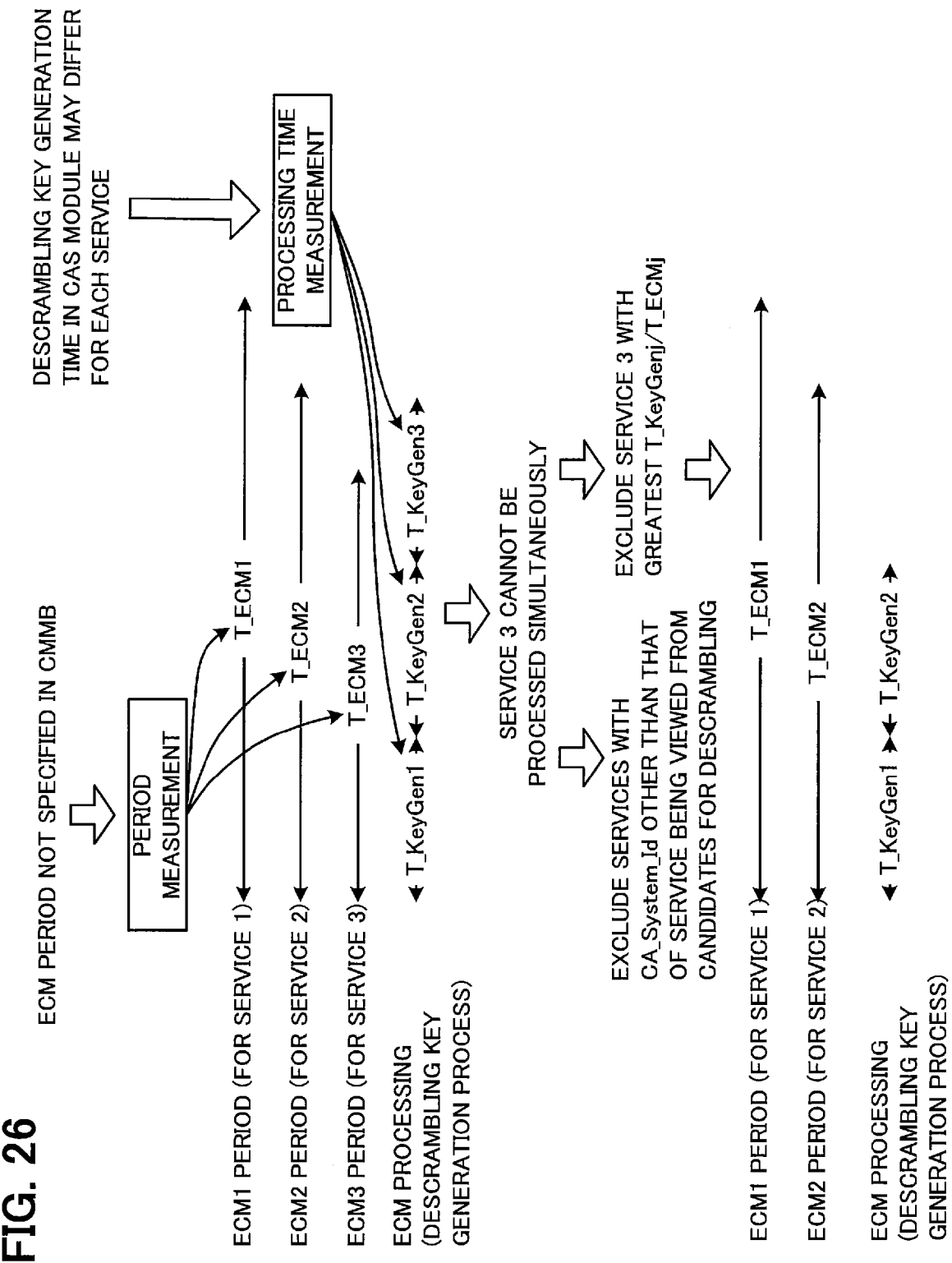
FIG. 26 is a flowchart showing an example of the derivation of the services to be descrambled in the digital broadcast receiver device according to the fifth embodiment.

FIG. 26 is a flowchart showing an example of the derivation of the services to be descrambled in the digital broadcast receiver device 500 according to the fifth embodiment. In the example shown in FIG. 26, services 1, 2, and 3 can be received simultaneously, and these services have different ECM update periods.

The update period measurement unit 535 measures the ECM update periods of the services. In FIG. 26, the ECM update periods of services 1, 2, and 3 measured by the 535 are indicated respectively as T_ECM1, T_ECM2, and T_ECM3. Since the update period measurement unit 535 measures the ECM update period of each service, services having different ECM update periods can be dealt with.

The key processing time measurement unit 536 measures the period of time needed for the Ks generation process when the ECM of the service is obtained. In FIG. 26, the Ks generation times of services 1, 2, and 3 measured by the key processing time measurement unit 536 are indicated respectively as T_KeyGen1, T_KeyGen2, and T_KeyGen3. The measurement carried out by the key processing time measurement unit 536 enables services having different descrambling key generation times in the CAS module to be dealt with.

The service determination unit 537 checks whether the ECM update periods of services 1, 2, and 3 are greater than the sum of the Ks generation times of services 1, 2, and 3, which are descrambling candidate services. In the example shown in FIG. 26, the following are checked.

Service 1 is checked to see if condition (1) below is satisfied:

$$T\_ECM1 > T\_KeyGen1 + T\_KeyGen2 + T\_KeyGen3 \quad (1)$$

Service 2 is checked to see if condition (2) below is satisfied.

$$T\_ECM2 > T\_KeyGen1 + T\_KeyGen2 + T\_KeyGen3 \quad (2)$$

Service 3 is checked to see if condition (3) below is satisfied.

$$T\_ECM3 < T\_KeyGen1 + T\_KeyGen2 + T\_KeyGen3 \quad (3)$$

In the example shown in FIG. 26, service 3 does not satisfy condition (3).

In that case, the service determination unit 537 performs the following process (a) or (b).

(a) Exclude from the candidate services for descrambling those services having CA_System_Id values that differ from that of the currently selected service.

(b) Exclude from the candidate services for descrambling the service having the highest T_KeyGen/T_ECM value.

If all the services in the example shown in FIG. 26 have the same CA_System_Id value, the service determination unit 537 performs process (b) to exclude service 3, which has the longest Ks generation time relative to its ECM update period, from the candidate services for descrambling.

The service determination unit 537 then checks whether the ECM update period of service 1 or service 2 is greater than the total Ks generation time of services 1 and 2, which are candidate services for descrambling. In the example shown in FIG. 26, the following is determined.

Service 1 is checked to see if condition (4) below is satisfied:

$$T\_ECM1 > T\_KeyGen1 + T\_KeyGen2 \quad (4)$$

Service 2 is checked to see if condition (5) below is satisfied:

$$T\_ECM2 > T\_KeyGen1 + T\_KeyGen2 \quad (5)$$

In the example shown in FIG. 26, services 1 and 2 satisfy the conditions given above, so the service determination unit 537 determines that services 1 and 2 are services to be descrambled.

Figure 27:
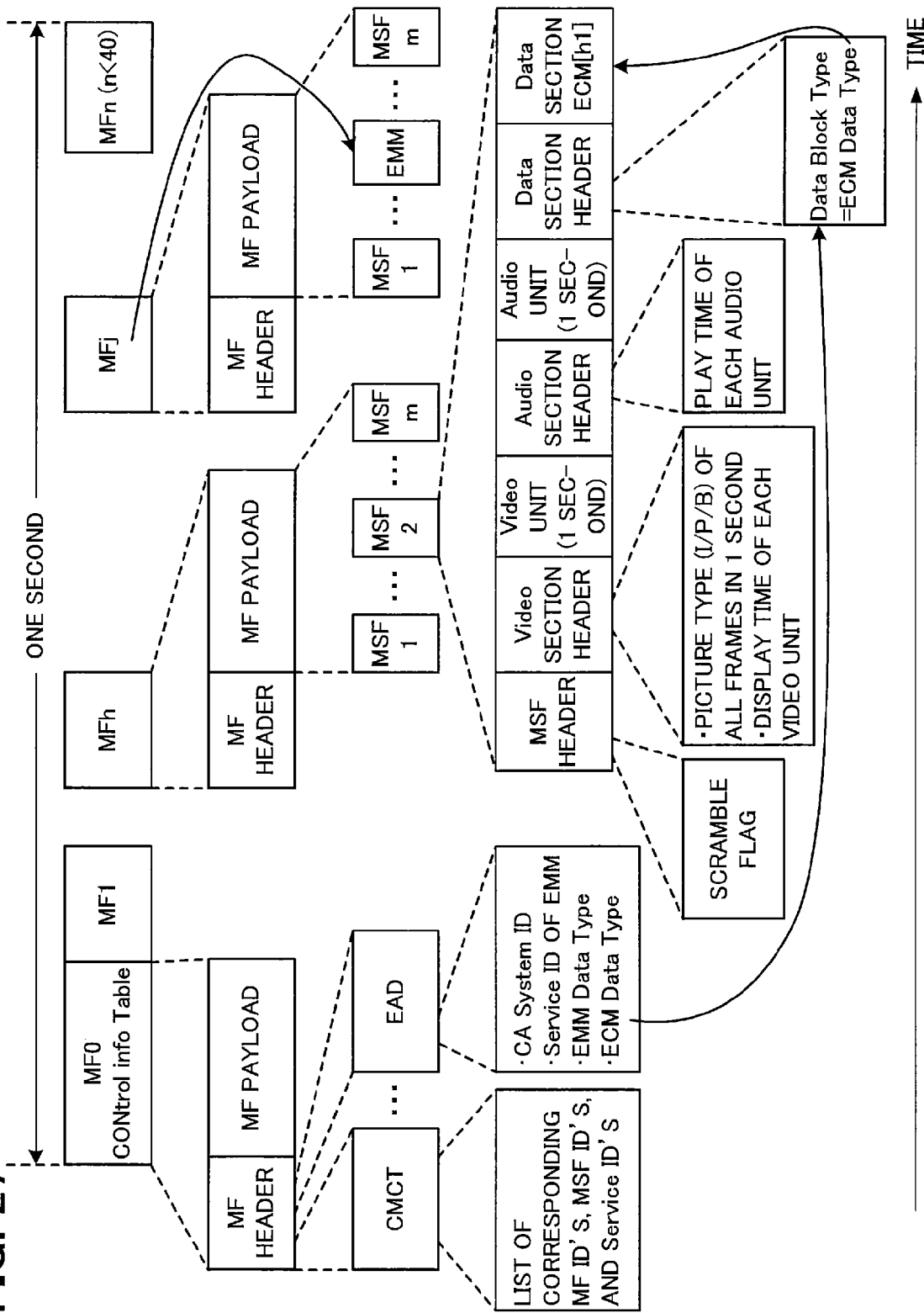
FIG. 27 schematically illustrates a stream structure in the CMMB standard.

Next an example of the reception of a CMMB digital broadcast by the digital broadcast receiver device 500 in the fifth embodiment will be described. FIG. 27 schematically illustrates the stream structure in the CMMB standard. CMMB streams are transmitted in the multiplex frame (MF) format. An MF has an MF header and an MF payload, and up to 40 MFs can be transmitted on a single physical channel. The multiplexed MFs are transmitted in one-second periods.

MF0 shown in FIG. 27 is a frame for transmitting control information; the other MFs (MF1 to MFn) are frames for transmitting audio units, video units, and data units. MF0 includes the service IDs of the services transmitted on the physical channel, the MFIDs of the MFs transmitted on the physical channel, and a CMCT (Continual Service Multiplex Configuration Table) which shows the correspondence with the MSFIDs of the MFs transmitted on the physical channel. MF0 also includes an EAD (Encryption and Authorization Description List) including the service ID of each service that carries an EMM, its CA_System_Id, the Data_Block_Type of the data section carrying the EMM, and the Data_Block_Type of the data section carrying the ECM. The digital broadcast receiver device 500 first analyzes the CMCT and EAD to find out which MFs belong to a TV service, which to a data service, which to a radio service, and which to an EMM transmission data section. An ECM is carried by an MF having the same MFID and MSFID as an MF carrying an audio section or video section.

When a TV service is viewed on the digital broadcast receiver device 500, the digital broadcast receiver device 500 obtains its Service_Id, MFID, and MSFID from the CMCT and uses the MFID and MSFID to extract the corresponding service. The MSFID has an MSF header; the digital broadcast receiver device 500 can see whether the stream has been scrambled by analyzing the MSF header. The MSF payload includes a one-second video unit, audio unit, and data unit. The audio section header and video section header include reproduction start time information for audio and video frames and information indicating the picture type (I-picture, P-picture, or B-picture) of each video frame. If the stream is a non-scrambled stream, the digital broadcast receiver device 500 proceeds with decoding in accordance with the reproduction time information.

If the stream has been scrambled, the digital broadcast receiver device 500 first obtains the service ID of the relevant EMM from the EAD and the corresponding MFID and MSFID from the CMCT. Then the digital broadcast receiver device 500 checks the EMM_Data_Type in the EAD, sets filtering parameters in accordance with the MFID, MSFID, and EMM_Data_Type, and extracts the EMM. The digital broadcast receiver device 500 inputs the extracted EMM to the CAS control unit 503 and sets a Km in the CAS module 532. The digital broadcast receiver device 500 then obtains the ECM_Data_Type from the EAD and extracts a data section having a matching Data_Block_Type, thereby extracting the ECM. The digital broadcast receiver device 500 inputs the extracted ECM to the CAS control unit 503, and then uses the Km to decrypt the encrypted Ks stored in the ECM and obtain the Ks. The digital broadcast receiver device 500 sets the decrypted Ks in the descrambling unit 504 and then descrambles the audio and video frames.

Figure 28:
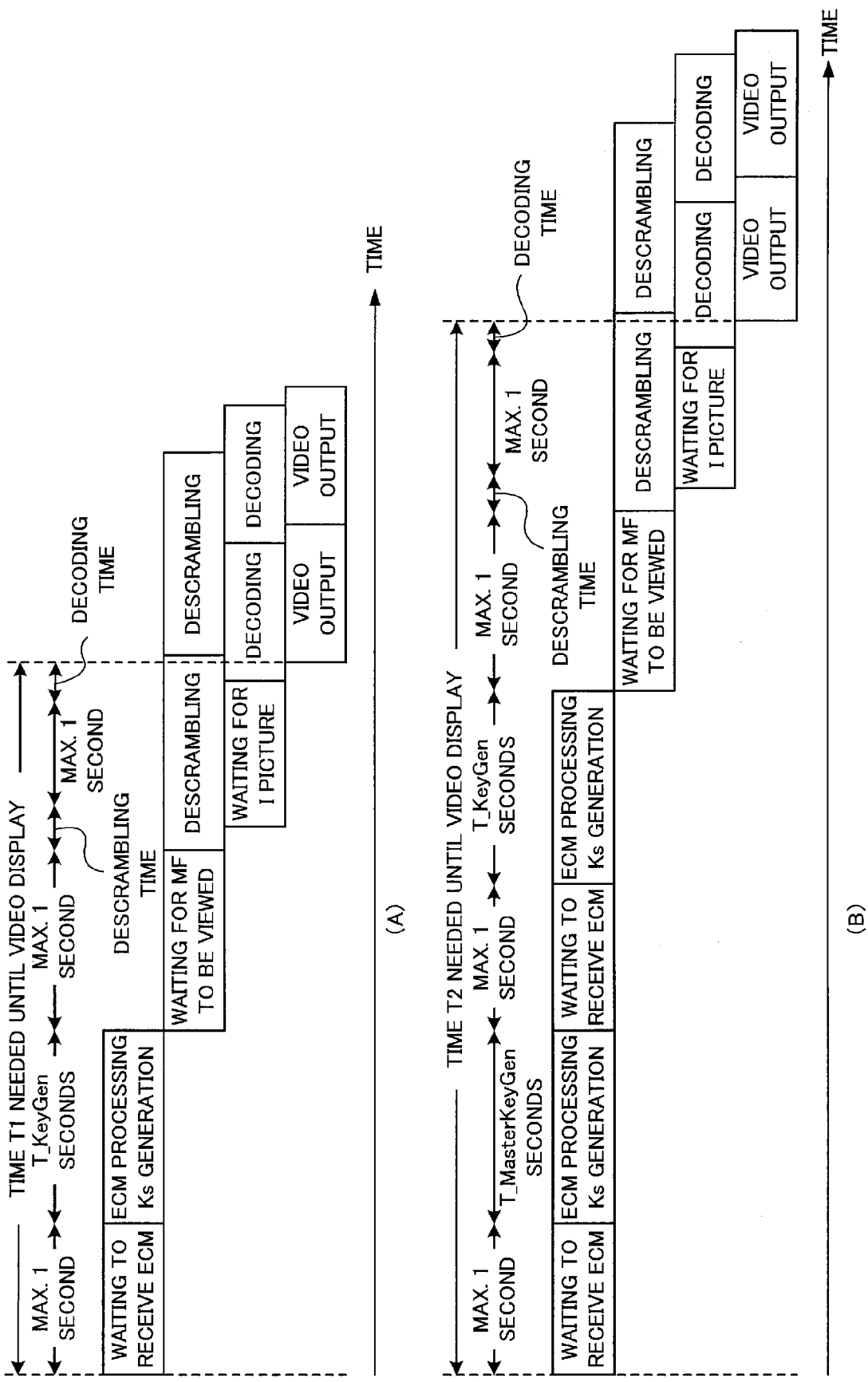
FIGS. 28(A) and 28(B) schematically illustrate the time necessary until video picture output following a station selection operation in a conventional digital broadcast receiver device.

FIGS. 28(A) and 28(B) schematically illustrate the time needed until a video picture is output following a station selection operation in a conventional digital broadcast receiver device.

FIG. 28(A) indicates the time needed until a video picture is output following a station selection operation when the EMM has not been updated.

The conventional digital broadcast receiver device first extracts the ECM. Since MFs containing ECMs are transmitted at one-second intervals, an ECM reception wait time of up to one second is necessary.

After receiving the ECM, the conventional digital broadcast receiver device processes the ECM to generate a Ks. The time needed to generate the Ks is T_KeyGen seconds. This time depends on the CAS module used and the content of the received ECM.

After the Ks is generated, the conventional digital broadcast receiver device sets the Ks in the descrambler and waits for an MF the content of which is the video stream to be viewed. The maximum wait time is one second, which is the MF periodicity.

After an MF to be viewed is received, the conventional digital broadcast receiver device performs descrambling and waits until it can detect an I picture in the descrambled video frame. The wait time for the detection of the I picture is also up to one second. Once an I picture can be detected, decoding starts and a video picture is output.

The maximum time T1 needed until video display in the conventional technology can be expressed by formula (6) below.

$$T1 = 3 \text{ (seconds)} + T\_KeyGen \text{ (seconds)} + (\text{descrambling time}) + (\text{decoding time}) \quad (6)$$

FIG. 28(B) indicates the time needed until a video picture is output following a station selection operation when the EMM has been updated. The maximum time T2 needed until video picture display in FIG. 28(B) has a value obtained by adding the maximum time T1 needed until video display in FIG. 28(A), the EMM wait time (up to one second), and the T_MasterKeyGen seconds needed for the processing of the EMM and the generation of the Km.

Figure 29:
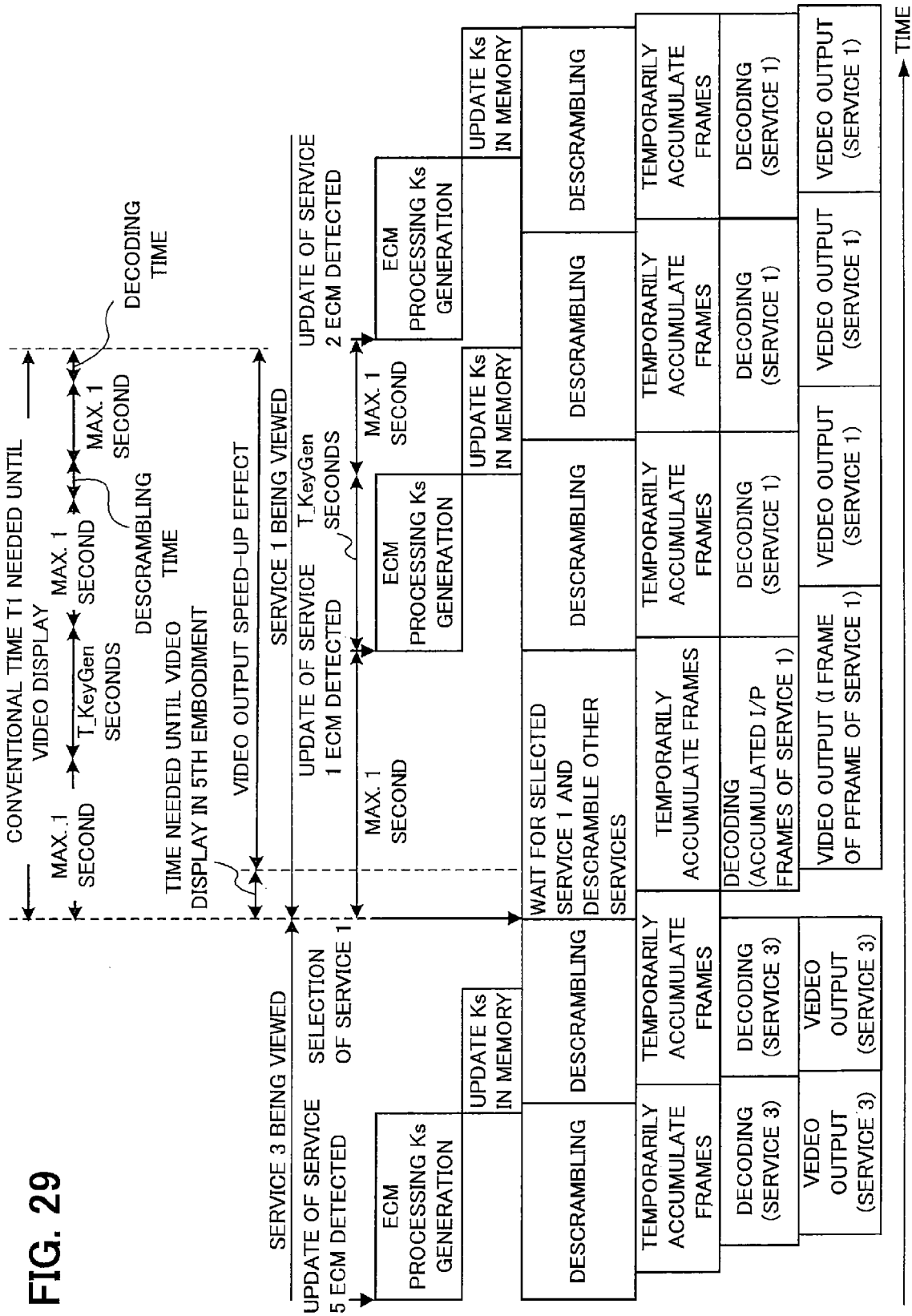
FIG. 29 schematically illustrates the time necessary until video picture output following a station selection operation when the EMM has not been updated in a digital broadcast receiver device according to the fifth embodiment.

FIG. 29 schematically illustrates the time needed until a video picture is output following a station selection operation when the EMM has not been updated in the digital broadcast receiver device 500 according to the fifth embodiment. FIG. 29 shows an example in which, while service 3 is selected, the digital broadcast receiver device 500 according to the fifth embodiment receives a station selection operation to switch to service 1.

While service 3 is selected, the digital broadcast receiver device 500 according to the fifth embodiment receives the ECMs of not only the currently selected service but also the other services, generates the Ks's of these services, and stores them in the key storage unit 533. The digital broadcast receiver device 500 also performs the descrambling process not only for the currently selected service but also for the streams of the other services. The digital broadcast receiver device 500 descrambles the I pictures, P pictures, and B pictures of the currently selected service: that is, all of their reference pictures and non-reference pictures. For services other than the currently selected service, the digital broadcast receiver device 500 descrambles only I pictures and P pictures: that is, only reference pictures. The digital broadcast receiver device 500 temporarily accumulates all the frames of the preceding MF period (one second) of each descrambled service in the video data storage unit 106. When a new MF is received, the digital broadcast receiver device 500 deletes the frames of the preceding MF period and stores the frames of the newly received MF period. In the decoding process in the digital broadcast receiver device 500, the video decoding unit 107 and audio decoding unit 110 decode only the frames of the currently selected service 3, and the audio and video of service 3 are output.

As illustrated in FIG. 28(A), when a selection operation to switch to service 1 is received from the user, the conventional broadcast receiver device waits for the reception of the ECM, generates a Ks following the reception of the ECM, waits for an MF of the desired service, performs descrambling, waits for an I picture, and then performs decoding and outputs a video picture. The time T1 needed until the video display begins is up to three seconds plus the Ks generation time (T_KeyGen seconds), the descrambling time, and the decoding time. FIG. 29 also shows this time T1.

Since the digital broadcast receiver device 500 according to the fifth embodiment has already stored the Ks of service 1 in the key storage unit 533, the Ks of service 1 can be read from the key storage unit 533 and set in the descrambling unit 504 immediately. With the digital broadcast receiver device 500, the ECM reception wait time and Ks generation time that are required in the conventional digital broadcast receiver device are unnecessary. After receiving a selection operation performed by the user to switch to service 1, the digital broadcast receiver device 500 can start descrambling immediately after receiving an MF of service 1, thereby speeding up start of decoding.

While service 3 is selected, the digital broadcast receiver device 500 according to the fifth embodiment further descrambles the I and P pictures of service 1 and other services and temporarily saves the descrambled picture data in the video data storage unit 106. Accordingly, the digital broadcast receiver device 500 can start decoding the accumulated I and P pictures of the preceding MF period (one second) immediately after the selection operation to switch to service 1 is received from the user. Therefore, in the digital broadcast receiver device 500, the time needed until the output of a video picture following the user's selection operation is basically just the time needed to decode an I picture. Specifically, since the ECM reception wait time, the Ks generation time following ECM reception, the wait time for the MF of the desired service, the descrambling time, and the I-picture wait time that were needed in the conventional digital broadcast receiver device are unnecessary, the digital broadcast receiver device 500 can greatly reduce time needed until video display begins in comparison with the conventional digital broadcast receiver device. The time is reduced by up to three seconds plus the Ks generation time (T_KeyGen seconds) and the descrambling time; video output can start much earlier in the digital broadcast receiver device 500.

After the operation to select service 1, the digital broadcast receiver device 500 according to the fifth embodiment continues receiving ECMs of a plurality of services including service 1, generating their Ks's and storing them in the key storage unit 533, descrambling the plurality of services, and temporarily accumulating descrambled video frames in the video data storage unit 106, and can start video display quickly when the next selection operation occurs. For CMMB broadcasts, video data are accumulated in the video data storage unit 106 for the preceding MF period; for broadcasting systems other than CMMB, data may be accumulated over an interval equal to, for example, the I picture periodicity.

FIG. 30 schematically illustrates the time needed until a video picture is output following a station selection operation when the EMM has been updated in the digital broadcast receiver device 500 according to the fifth embodiment. In the example illustrated in FIG. 30, while service 3 is selected, the digital broadcast receiver device 500 according to the fifth embodiment receives a selection operation to switch to service 1.

While service 3 is selected, the digital broadcast receiver device 500 according to the fifth embodiment receives ECMs of the currently selected service and other services, generates their Ks's, stores them in the key storage unit 533, and descrambles the streams of the currently selected service and the other services. The digital broadcast receiver device 500 further detects whether the EMM has been updated and, if the EMM has been updated, inputs the EMM to the CAS control unit 503 and generates a Km. The digital broadcast receiver device 500 descrambles the I pictures, P pictures, and B pictures of the currently selected service. For the services other than the currently selected service, the digital broadcast receiver device 500 descrambles just the I pictures and P pictures. The digital broadcast receiver device 500 temporarily accumulates all frames of the preceding MF period (1 second) of each descrambled service in the video data storage unit 106. When a new MF is received, the digital broadcast receiver device 500 deletes the frames of the preceding MF period and stores the frames newly received in one MF period. In the decoding process in the digital broadcast receiver device 500, only the frames of the currently selected service 3 are decoded by the video decoding unit 107 and audio decoding unit 110, and the audio and video of service 3 are output.

As illustrated in FIG. 28(B), when a selection operation to switch to service 1 is received from the user, the conventional broadcast receiver device waits for the reception of an EMM, generates a Km following the reception of the EMM, waits for the reception of an ECM, generates a Ks following the reception of the ECM, waits for the MF of the desired service, performs descrambling, waits for an I picture, and then performs decoding and outputs a video picture. The time T2 needed until the video display begins is up to four seconds plus the Km generation time (T_MasterKeyGen seconds), the Ks generation time (T_KeyGen seconds), the descrambling time, and the decoding time. FIG. 30 also shows this time T2.

The digital broadcast receiver device 500 according to the fifth embodiment has already generated Ks's from ECMs of all related services and stored them in the key storage unit 533 when the update of the EMM is detected, so the Ks of service 1 can be read from the 533 and set in the descrambling unit 504 immediately. The digital broadcast receiver device 500 can dispense with the EMM reception wait time, Km generation time, ECM reception wait time, and Ks generation time that are required in the conventional digital broadcast receiver device. After receiving a selection operation performed by the user to switch to service 1, the digital broadcast receiver device 500 can start descrambling immediately after receiving an MF of service 1, thereby speeding up the start of decoding.

While service 3 is selected, the digital broadcast receiver device 500 according to the fifth embodiment further descrambles the I and P pictures of service 1 and other services and temporarily saves the descrambled picture data in the video data storage unit 106. Accordingly, the digital broadcast receiver device 500 can start decoding the I and P pictures of the preceding MF period (one second) immediately after the selection operation to switch to service 1 is received from the user. Therefore, in the digital broadcast receiver device 500, the time needed until the output of a video picture following the user's selection operation is basically just the time needed to decode an I picture. Specifically, since the EMM reception wait time, the Km generation time following EMM reception, the ECM reception wait time, the Ks generation time following ECM reception, the wait time for the MF of the desired service, the descrambling time, and the I picture wait time, which were required in the conventional digital broadcast receiver device, are unnecessary, the digital broadcast receiver device 500 can greatly reduce the time needed until video display begins in comparison with the conventional digital broadcast receiver device. The time is reduced by up to four seconds plus the Km generation time (T_MasterKeyGen seconds), the Ks generation time (T_KeyGen seconds), and the descrambling time; video output can start much earlier in the digital broadcast receiver device 500.

After the operation to select service 1, the digital broadcast receiver device 500 according to the fifth embodiment continues receiving EMMs of a plurality of services including service 1, generating their Km's, receiving ECMs, generating Ks's and storing them in the key storage unit 533, descrambling the plurality of services, and temporarily accumulating descrambled video frames in the video data storage unit 106, and can start video display swiftly when the next selection operation occurs. For CMMB broadcasts, video data are accumulated in the video data storage unit 106 for the preceding MF period; for broadcasting systems other than CMMB, data may be accumulated over an interval equal to, for example, the I picture periodicity.

In the digital broadcast receiver device 500 according to the fifth embodiment, the CAS control unit 503 performs the Km generation process and Ks generation process for a plurality of services by time division and saves the generated Ks's, and the descrambling unit 504 descrambles a plurality of services and temporarily accumulates descrambled video data in the video data storage unit 106 before a selection operation is made. Accordingly, even if a newly selected service is a scrambled service, the digital broadcast receiver device 500 can dispense with the EMM reception wait time, Km generation time, ECM reception wait time, Ks generation time, descrambled data accumulation time (MF wait time in CMMB reception), descrambling time, and I picture wait time, and can start video output quickly.

Since the CAS module 532 generates Km's and Ks's for a plurality of services by time division, the CAS control unit 503 does not need to include a plurality of CAS modules 532, and its cost can be reduced accordingly. The descrambling control unit 534 furthermore sets Ks's and controls the start of descrambling so as to perform the descrambling of a plurality of services by time division, eliminating the need to equip the digital broadcast receiver device with a plurality of descrambling units 504, and reducing its cost accordingly.

The digital broadcast receiver device 500 performs the EMM reception process and ECM reception process for the currently selected service and also performs the EMM reception process and ECM reception process for services that are not selected, and the service determination unit 537 determines which services to descramble such that the Km generation process and Ks generation process of all services to be descrambled are completed within the ECM update period of each service. Therefore, the single CAS module 532 in the digital broadcast receiver device 500 can perform the Km generation process and Ks generation process of a plurality of services by time division, and the received streams of a plurality of services can be descrambled successfully.

The service determination unit 537 excludes non-subscribed services when the services to be descrambled are selected, and in excluding other services from the services to be descrambled, it can start by excluding the services least likely to be viewed. The digital broadcast receiver device 500 therefore focuses on a limited number of highly necessary services and descrambles these services beforehand, so that after switching to almost all of the services that the user selects, it can start video display in a short time.

If the Km generation process and Ks generation process of all the services to be descrambled cannot be completed in the corresponding ECM update period, the service determination unit 537 excludes from the services to be descrambled those services having CA_System_Id values that differ from the CA_System_Id value of the current service. The services to be descrambled can therefore be narrowed down to services that have the same EMM, that is, services that, when selected, are very likely not to require a Km generation process, thereby reducing the time for which each service uses the CAS module. This makes it possible to descramble many services beforehand in the digital broadcast receiver device 500, so that the video display of many of the services that the user selects can be started quickly.

When the service determination unit 537 determines which services to descramble, it also excludes the service having the highest proportion of Ks generation time in the ECM update period. Services that use the CAS module 532 for only short periods at a time are therefore left as services to be descrambled. The digital broadcast receiver device 500 can accordingly descramble many services beforehand and can start video display quickly for many of the services that the user selects.

Since the digital broadcast receiver device 500 includes the update period measurement unit 535, which monitors and measures the ECM update period of each service, a plurality of services can be descrambled successfully even if the ECM update period is not specified in the broadcast standard, and even if the update period varies depending on the service, varies from time to time in the same service, or varies depending on the region.

Since the digital broadcast receiver device 500 includes the key processing time measurement unit 536, which continuously monitors and measures the Ks generation time of each service, from the reception of the ECM until the completion of Ks generation in the CAS module 532, a plurality of services can be descrambled successfully even if the upper limit of the Ks generation time is not specified in the broadcast standard, and even if the Ks generation time in the CAS module 532 varies depending on the service, varies from time to time in the same service, varies depending on the region, or varies depending on the processing performance of the CAS module.

Further, since the key processing time measurement unit 536 continuously monitors and measures the Km generation time, from the reception of the EMM to the completion of Km generation in the CAS module 532, a plurality of services can be descrambled successfully even if the upper limit of the Km generation time is not specified in the broadcast standard, and even if the Km generation time in the CAS module 532 varies depending on the service, varies from time to time in the same service, varies depending on the region, or varies depending on the processing performance of the CAS module.

The key storage unit 533 stores the Ks's of the plurality of services to be descrambled in association with their service IDs. In descrambling prior to decoding, the digital broadcast receiver device 500 can therefore fetch a Ks that has already been generated and stored in the key storage unit 533 and set it in the descrambling unit 504 immediately. When the digital broadcast receiver device 500 performs the descrambling process by time division, accordingly, there is no need to generate a Ks each time, and the descrambling time per service can be reduced. Consequently, the digital broadcast receiver device 500 can accumulate the video data of many services temporarily in the video data storage unit 106 and can start video display quickly for many services when they are selected by a user operation.

Sixth Embodiment

The digital broadcast receiver device 600 according to the sixth embodiment has substantially the same configuration as the digital broadcast receiver device 500 according to the fifth embodiment, but the operation of the service determination unit 637 in the CAS control unit 603 is different. The service determination unit 637 in the sixth embodiment differs from the service determination unit 537 in the fifth embodiment in that a process is added for the case in which a plurality of services are determined in step S810 or step S813 in FIG. 25 to be excluded from the candidate services for descrambling.

If a plurality of services are determined in step S810 or S813 in FIG. 25 to be excluded from the candidate services for descrambling, the service determination unit 637 preferentially leaves services having channel numbers close to the currently selected channel number as services to be descrambled. For example, the service determination unit 637 excludes the service that has the greatest absolute value V1 expressed by the formula (7) below from the candidate services for descrambling.

$$V1 = |CH[h] - CH[current]| \quad (7)$$

where CH[current] is the channel number of the currently selected service and CH[h] is the channel number of a service h determined to be excluded from the candidate services for descrambling.

In other words, the service having the greatest difference in channel number is excluded from the candidate services for descrambling.

In CMMB, the service determination unit 637 excludes from the descrambling candidate services only the service having a MFID[h] giving the greatest absolute value V2 in formula (8) below $$V2 = |MF[h] - MF[current]| \quad (8)$$

where MF[current] is the MF number of the service that is currently being viewed and MF[h] is the MF number of a service h determined to be excluded from the candidate services for descrambling.

In other words, the service having the greatest difference in MF number is excluded from the candidate services for descrambling.

In the digital broadcast receiver device 600 according to the sixth embodiment, when the service determination unit 637 narrows down the services to be excluded from the candidate services for descrambling, the service having the channel number farthest from the channel number of the current service is excluded, so when the user makes a selection operation to increment or decrement the channel number of the currently selected service by one, the video picture of the selected service can be displayed quickly.

In CMMB reception, when the service determination unit 637 narrows down the services to be excluded from the candidates for the services to be descrambled, the service having the MF number farthest from the currently selected MF number is excluded, so when the user makes a selection operation to increment or decrement the MF number of the currently selected MF by one, the video picture of the selected service can be displayed quickly.

Seventh Embodiment

The digital broadcast receiver device 700 according to the seventh embodiment has substantially the same configuration as the digital broadcast receiver device 500 according to the fifth embodiment, but the operation of the CAS module 732 in the CAS control unit 703 is different.

When a new EMM is received during the process of generating a Km from the EMM, the CAS module 732 in the seventh embodiment suspends the current Km generation process and starts the Km generation process for the new EMM. The final output data (interim results) of the Km generation process that has just been suspended and the next input start position (data position) of the data to be input next are saved in a memory 732a in the CAS module 732, in association with the corresponding EMM. When input matching the saved EMM is received, the CAS module 732 resumes the Km generation process, using the saved final output data and the input data indicated by the next input start position as inputs to the current process.

When a new ECM is received during the process of generating a Ks from the ECM, the CAS module 732 in the seventh embodiment suspends the ongoing process and starts a process to generate a Ks for the new ECM. The final output data (interim results) of the Ks generation process that has just been suspended and the next input start position (data position) of the data to be input next are saved in the memory 732a in the CAS module 732, in association with the corresponding ECM. When the input matching the saved ECM is received, the CAS module 732 resumes the Ks generation process, using the saved final output data and the input data indicated by the next input start position as inputs to the current process.

In the digital broadcast receiver device 700 according to the seventh embodiment, the CAS module 732 suspends the Km generation process or Ks generation process but saves the data being processed, and when the same Km generation process or Ks generation process is requested next, resumes the process by using the saved data as input data. Even if the Km generation process or Ks generation process of a service cannot be completed in the ECM update period, the data in process are recorded so that the process can be resumed from the position where it was suspended; consequently, the service determination unit 537 can increase the number of services to be descrambled.

REFERENCE CHARACTERS 100, 200, 300, 400, 500 digital broadcast receiver device, 101 tuner unit, 102, 502 demultiplexer unit, 103, 503, 603, 703 CAS control unit, 531 EMM/ECM processing control unit, 532, 732, CAS module, 533 key storage unit, 534 descrambling control unit, 535 update period measurement unit, 536 key processing time measurement unit, 537, 637 service determination unit, 104, 504 descrambling unit, 105 picture type detection unit, 106, 406 video data storage unit, 107 video decoding unit, 108 video output unit, 109 audio data storage unit, 110 audio decoding unit, 111 audio output unit, 112 time management unit, 113 user instruction photo-receiving unit, 114, 214, 314, 414, 514 control unit, 115 service information storage unit.

What is claimed is:

1. A digital broadcast receiver device comprising:
   a tuner unit for demodulating a broadcast signal on a selected physical channel, and outputting a stream obtained by demodulation;
   a demultiplexer unit for extracting encrypted video data and key information for a plurality of services included in the stream;
   a CAS control unit for generating keys for decoding the encrypted video data of the plurality of services, for each of the plurality of services, on a basis of the key information;
   a descrambling unit for using the keys of the plurality of services to decrypt the encrypted video data of the plurality of services and generate video data for the plurality of services; and
   a video decoding unit for decoding and outputting the video data for one of the plurality of services; wherein
   the CAS control unit further comprises
   a CAS module for generating the keys from the key information,
   a key storage unit for storing the keys generated by the CAS module in correspondence to the services,
   a descrambling control unit for setting the keys stored in the key storage unit in the descrambling unit,
   an update period measurement unit for measuring the update period of the key information for each of the plurality of services,
   a key processing time measurement unit for measuring the key processing time taken to generate the keys from the key information, for each of the plurality of services, and
   a service determination unit for determining, from among the plurality of services, the services to be decrypted and thus descrambled in the descrambling unit, such that a total key processing time of all of the services to be decrypted is less than each one of the update periods of the services to be decrypted.

2. The digital broadcast receiver device of claim 1, wherein:
   the CAS module generates the keys of the plurality of services by time division;
   the descrambling control unit extracts from the key storage unit the keys corresponding to each of the plurality of services and sets the extracted keys in the descrambling unit by time division; and
   the descrambling unit decrypts the encrypted video data of the plurality of services by time division.

3. The digital broadcast receiver device of claim 1, wherein the service determination unit excludes non-subscribed services among the plurality of services from the services to be decrypted.

4. The digital broadcast receiver device of claim 1, wherein if a total key processing time of all of the services to be decrypted is greater than or equal to any one of the update periods of the services to be decrypted, the service determination unit excludes from the services to be decrypted a service having a CA_System_Id value that differs from the CA_System_Id value of the currently selected service.

5. The digital broadcast receiver device of claim 4, wherein if a plurality of services have a CA_System_Id value that differs from the CA_System_Id value of the currently selected service, the service determination unit excludes from the services to be decrypted a service having a greatest difference in channel number from the currently selected service.

6. The digital broadcast receiver device of claim 4, wherein if a plurality of services have a CA_System_Id value that differs from the CA_System_Id value of the currently selected service, the service determination unit excludes from the services to be decrypted a service having a greatest difference in MF number from the currently selected service.

7. The digital broadcast receiver device of claim 1, wherein if a total key processing time of all of the services to be decrypted is greater than or equal to any one of the update periods of the services to be decrypted, the service determination unit excludes from the services to be decrypted a service having a highest ratio of key processing time to update period.

8. The digital broadcast receiver device of claim 7, wherein if a plurality of services have the highest ratio of key processing time to update period, the service determination unit excludes from the services to be decrypted a service having a greatest difference in channel number from the currently selected service.

9. The digital broadcast receiver device of claim 7, wherein if a plurality of services have the highest ratio of key processing time to update period, the service determination unit excludes from the services to be decrypted a service having a greatest difference in MF number from the currently selected service.

10. The digital broadcast receiver device of claim 1, wherein when key generation is suspended, the CAS module saves interim results at the point of suspension and saves the position of data to be processed next in the key information, and when the key generation is resumed, the CAS module starts processing the key information from the saved data position on a basis of the saved interim results.

11. A digital broadcast receiving method comprising:
    a tuning step for demodulating a broadcast signal on a selected physical channel, and outputting a stream obtained by demodulation;
    a demultiplexing step for extracting encrypted video data and key information for a plurality of services included in the stream;
    a CAS control step for generating keys for decoding the encrypted video data of the plurality of services, for each of the plurality of services, on a basis of the key information of the plurality of services;
    a descrambling step for using the keys of the plurality of services to decrypt the encrypted video data of the plurality of services and generate video data for the plurality of services; and
    a video decoding step for decoding and outputting the video data for one of the plurality of services; wherein
    the CAS control step further comprises
    a key generating step for generating the keys from the key information,
    a key storage step for storing the keys generated by the CAS module in correspondence to the services,
    a descrambling control unit step setting the keys stored in the key storage step as keys for use in the descrambling step,
    an update period measurement step for measuring the update period of the key information for each of the plurality of services, a key processing time measurement step for measuring the key processing time taken to generate the keys from the key information, for each of the plurality of services, and a service determination step for determining, from among the plurality of services, the services to be decrypted and thus descrambled in the descrambling step, such that a total key processing time of all of the services to be decrypted is less than each one of the update periods of the services to be decrypted.

12. The digital broadcast receiving method of claim 11, wherein the service determination step excludes non-subscribed services among the plurality of services from the services to be decrypted.

13. The digital broadcast receiving method of claim 11, wherein if a total key processing time of all of the services to be decrypted is greater than or equal to any one of the update periods of the services to be decrypted, the service determination step excludes from the services to be decrypted a service having a CA_System_Id value that differs from the CA_System_Id value of the currently selected service.

14. The digital broadcast receiving method of claim 13, wherein if a plurality of services have a CA_System_Id value that differs from the CA_System_Id value of the currently selected service, the service determination step excludes from the services to be decrypted a service having a greatest difference in channel number from the currently selected service.

15. The digital broadcast receiving method of claim 13, wherein if a plurality of services have a CA_System_Id value that differs from the CA_System_Id value of the currently selected service, the service determination step excludes from the services to be decrypted a service having a greatest difference in MF number from the currently selected service.

16. The digital broadcast receiving method of claim 11, wherein if a total key processing time of all of the services to be decrypted is greater than or equal to any one of the update periods of the services to be decrypted, the service determination step excludes from the services to be decrypted a service having a highest ratio of key processing time to update period.

17. The digital broadcast receiving method of claim 16, wherein if a plurality of services have the highest ratio of key processing time to update period, the service determination step excludes from the services to be decrypted a service having a greatest difference in channel number from the currently selected service.

18. The digital broadcast receiving method of claim 16, wherein if a plurality of services have the highest ratio of key processing time to update period, the service determination step excludes from the services to be decrypted a service having a greatest difference in MF number from the currently selected service.

19. The digital broadcast receiving method of claim 11, wherein when key generation is suspended, the key generating step saves interim results at the point of suspension and saves the position of data to be processed next in the key information, and when the key generation is resumed, the key generating step starts processing the key information from the saved data position on a basis of the saved interim results.

* * * * *